(12) United States Patent
Ma

(10) Patent No.: US 11,178,000 B2
(45) Date of Patent: Nov. 16, 2021

(54) METHOD AND SYSTEM FOR PROCESSING NF COMPONENT EXCEPTION, AND DEVICE

(71) Applicant: Huawei Technologies Co., Ltd., Shenzhen (CN)

(72) Inventor: Jingwang Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 16/418,029

(22) Filed: May 21, 2019

(65) Prior Publication Data

US 2019/0273650 A1    Sep. 5, 2019

Related U.S. Application Data

(63) Continuation of application No. PCT/CN2017/096262, filed on Aug. 7, 2017.

(30) Foreign Application Priority Data

Nov. 21, 2016  (WO) ................ PCT/CN2016/106685

(51) Int. Cl.
*H04L 12/24* (2006.01)
*H04L 12/911* (2013.01)
(Continued)

(52) U.S. Cl.
CPC ........ *H04L 41/0654* (2013.01); *G06F 9/5077* (2013.01); *H04L 41/0677* (2013.01);
(Continued)

(58) Field of Classification Search
CPC . H04L 41/0654; H04L 47/787; H04L 47/746; H04L 41/5058; H04L 41/0677; G06F 9/5077

See application file for complete search history.

(56) References Cited

U.S. PATENT DOCUMENTS 9,645,899 B1 *  5/2017  Felstaine ............. G06F 11/2025
9,806,979 B1 * 10/2017  Felstaine ............. H04L 41/0893
(Continued)

FOREIGN PATENT DOCUMENTS

CN        1984076 A    6/2007
CN      102387083 A    3/2012
(Continued)

OTHER PUBLICATIONS

Machine Translation and Abstract of Chinese Publication No. CN1984076, Jun. 20, 2007, 14 pages.
Machine Translation and Abstract of Chinese Publication No. CN104284359, Jan. 14, 2015, 16 pages.
Machine Translation and Abstract of Chinese Publication No. CN102387083, Mar. 21, 2012, 14 pages.
(Continued)

*Primary Examiner* — Philip J Chea
*Assistant Examiner* — Wuji Chen
(74) *Attorney, Agent, or Firm* — Conley Rose, P.C.

(57) ABSTRACT

A method and a system for processing an NF component exception, where the method is applied to a network including user equipment, a first NF component, a second NF component, and an NF repository management function component. The method includes: receiving, by the NF repository management function component, an NF discovery request message that includes an identifier of a set to which the second NF component belongs; determining, by the NF repository management function component based on the identifier of the set to which the second NF component belongs, that a third NF component having a same function as the second NF component exists in the network; and sending, by the NF repository management function component to the first NF component, a first message that includes an identifier of the third NF component.

26 Claims, 18 Drawing Sheets

(51) Int. Cl.
    *H04L 12/915*    (2013.01)
    *G06F 9/50*    (2006.01)

(52) U.S. Cl.
    CPC ........ *H04L 41/5058* (2013.01); *H04L 47/746* (2013.01); *H04L 47/787* (2013.01)

(56) References Cited

U.S. PATENT DOCUMENTS

| | | | |
|---|---|---|---|
| 2011/0188403 | A1 | 8/2011 | Calippe et al. |
| 2014/0281670 | A1 | 9/2014 | Vasseur et al. |
| 2015/0358248 | A1 | 12/2015 | Saha et al. |
| 2016/0006623 | A1 | 1/2016 | Liu et al. |
| 2016/0057075 | A1* | 2/2016 | Parikh .................. H04L 47/762 709/226 |
| 2016/0149771 | A1 | 5/2016 | Prasad et al. |
| 2016/0156513 | A1* | 6/2016 | Zhang .................... H04W 4/70 709/220 |
| 2016/0212048 | A1 | 7/2016 | Kaempfer et al. |
| 2016/0234082 | A1* | 8/2016 | Xia .................... H04L 41/5096 |
| 2016/0277509 | A1 | 9/2016 | Qiang |
| 2017/0085486 | A1 | 3/2017 | Chung et al. |
| 2017/0086118 | A1* | 3/2017 | Vrzic .................... H04W 36/26 |
| 2017/0141973 | A1* | 5/2017 | Vrzic .................... H04L 41/5051 |
| 2017/0303259 | A1* | 10/2017 | Lee ....................... H04W 12/08 |
| 2020/0028920 | A1* | 1/2020 | Livanos ................ H04W 48/16 |
| 2020/0137174 | A1* | 4/2020 | Stammers ............ H04L 67/141 |
| 2020/0396132 | A1* | 12/2020 | Wang .................. H04L 41/0853 |

FOREIGN PATENT DOCUMENTS

| | | |
|---|---|---|
| CN | 104284359 A | 1/2015 |
| CN | 104579889 A | 4/2015 |
| CN | 105052205 A | 11/2015 |
| CN | 105262664 A | 1/2016 |
| CN | 105490908 A | 4/2016 |
| JP | 2013518521 A | 5/2013 |
| JP | 2018534645 A | 11/2018 |
| WO | 2016050663 A1 | 4/2016 |
| WO | 2016169246 A1 | 10/2016 |

OTHER PUBLICATIONS

Machine Translation and Abstract of Chinese Publication No. CN105490908, Apr. 13, 2016, 32 pages.
Machine Translation and Abstract of International Publication No. WO2016169246, Oct. 27, 2016, 71 pages.
Cisco, et al., "Key issue on scaling and virtualization support" SA WG2 Meeting #113AH, S2-161068, Feb. 23-26, 2016, Sophia Antipolis, France, (revision of S2-16xxxx), 1 page.
Huawei, et al., "Solution: The discovery of NFs," 3GPP TSG SA WG2 Meeting #114, S2-161506, Apr. 11-15, 2016, Sophia Antipolis, France, (Revision of 32-16xxxx), 6 pages.
Foreign Communication From A Counterpart Application, PCT Application No. PCT/CN2016/106685, English Translation of International Search Report dated Jun. 29, 2017, 2 pages.
Foreign Communication From A Counterpart Application, PCT Application No. PCT/CN2016/106685, English Translation of Written Opinion dated Jun. 29, 2017, 4 pages.
Foreign Communication From A Counterpart Application, PCT Application No. PCT/CN2017/096262, English Translation of International Search Report dated Nov. 1, 2017, 2 pages.
Foreign Communication From A Counterpart Application, PCT Application No. PCT/CN2017/096262, English Translation of Written Opinion dated Nov. 1, 2017, 4 pages.
"Study on Architecture for Next Generation System (Releace 14)," 3GPP TR 23.799 V0.6.0, Jul. 2016, 5 pages.
Dreibholz, T., et al, "The Applicability of Reliable Server Pooling (RSerPool) for Virtual Network Function Resource Pooling (VNFPOOL)," XP015111188, draft-dreibholz-vnfpool-rserpool-applic-03.txt, Feb. 12, 2016, pp. 1-15.
Xia, L., et al, "Requirements and Use Cases for Virtual Network Functions," XP015103103, draft-xia-vnfpool-use-cases-02.txt, Nov. 11, 2014, pp. 1-18.
Zong, N., et al, "Virtualized Network Function (VNF) Pool Problem Statement," XP015099967, draft-zong-vnfpool-problem-statement-06, Jul. 1, 2014, pp. 1-13.
Foreign Communication From A Counterpart Application, European Application No. 17872745.9, Extended European Search Report dated Oct. 17, 2019, 14 pages.
Huawei, et al., "Solution: The discovery of NFs," S2-161506, 3GPP TSG SA WG2 #114, Apr. 5, 2016, 6 pages.

* cited by examiner

METHOD AND SYSTEM FOR PROCESSING NF COMPONENT EXCEPTION, AND DEVICE

CROSS-REFERENCE TO RELATED APPLICATIONS

This application is a continuation of International Patent Application No. PCT/CN2017/096262, filed on Aug. 7, 2017, which claims priority to International Patent Application No. PCT/CN2016/106685, filed on Nov. 21, 2016, The disclosures of the aforementioned applications are hereby incorporated by reference in their entireties.

TECHNICAL FIELD

The present disclosure relates to the field of communications technologies, and in particular, to a method and a system for processing a Network Function (NF) component exception, and a device.

BACKGROUND

Currently, network services (such as a mobility management function, a bearer management function, and a location management function) implemented in an Evolved Packet Core (EPC) network are implemented via a service feature and processing logic that are inherent in a Network Element (NE) in the EPC network and through procedure message exchange between NEs. For example, an access service of a user needs to be completed via standardized service procedure logic and through coordination among a Mobility Management Entity (MME), a Serving Gateway (S-GW), a Packet Data Network Gateway (P-GW), a Policy and Charging Rules Function (PCRF), and a Home Subscriber Server (HSS) in the EPC network.

With continuous expansion of business models and continuous development of technologies, a service requirement of the user accordingly changes, such that more service modes and a better service feature are required. For example, there is a requirement for ultra-low delay communication or a requirement for high-reliability communication. With the change of the service requirement of the user, there is a requirement for various network services in the network. However, the network services provided by the EPC network are inherent and distributed in all NEs. In this case, if a new network function needs to be introduced to support the service requirement of the user, the EPC network needs to redefine and redesign processing logic and procedure interaction of the NE. However, the redesign means a long development period and high costs for a device manufacturer, and means that an operator cannot deploy a new network service in a timely manner.

To resolve the problem and meet a future network requirement, persons skilled in the art usually split an NE in a core network into different NF components based on function types. For example, the MME is split into an NF component having an authentication and security function, an NF component having a session management function, an NF component having a mobility management function, and an NF component having an access control function. The NF components whose functions are decoupled and independent from each other exchange procedure messages with another NF component via service interfaces supported by the NF components, to complete a network service provided by the core network. However, after an original NE is split into different NF components, if an exception (such as overload or a fault) occurs in one of the NF components, procedure message exchange between the NF components is affected, and consequently network quality of service of the entire network deteriorates.

SUMMARY

This application provides a method and a system for processing an NF component exception, and a device, to resolve the following existing problem. When an exception occurs in an NF component, procedure message exchange between NF components is affected, and network quality of service of a network deteriorates.

To achieve the foregoing objective, the following technical solutions are used in this application.

According to a first aspect, this application provides a method for processing a network function (NF) component exception, where the method may be applied to a network including a user equipment (UE), a first NF component, and a second NF component, the user equipment communicates with the second NF component via the first NF component, and the network further includes an NF repository management function component. The method includes: receiving, by the NF repository management function component, an NF discovery request message that is used to request the NF repository management function component to query whether an alternative NF component exists in the network in which the second NF component is located; determining, by the NF repository management function component, that an alternative third NF component exists in the network; and sending, by the NF repository management function component, a first message to the first NF component, where the first message includes an identifier of the third NF component, and the first message is used to instruct the first NF component to send, to the third NF component, received signaling sent by the user equipment.

The alternative NF component may be an NF component that has a same function as the second NF component and that is in a same component set as the second NF component.

Therefore, when the second NF component is faulty (for example, is overloaded or shut downs), the NF repository management function component may determine the third NF component having a same function as the second NF component, and instruct the first NF component to forward, to the third NF component, signaling to be originally forwarded to the second NF component, such that the third NF component processes the signaling. Therefore, it is ensured that when the second NF component is faulty, a procedure message can still be properly exchanged between NF components, and network quality of service of the network is ensured.

With reference to the first aspect, in a possible implementation of the first aspect, the NF repository management function component may determine the alternative third NF component based on an identifier of a set to which the second NF component belongs. For example, the NF repository management function component may pre-store at least one NF component set, and the NF discovery request message may include the identifier of the set to which the second NF component belongs.

After receiving the NF discovery request message that includes the identifier of the set to which the second NF component belongs, the NF repository management function component searches the at least one NF component set. If a first NF component set exists in the at least one NF component set, an identifier of the first NF component set is the same as the identifier of the set to which the second NF component belongs, and the first NF component set includes an NF component other than the second NF component, the NF repository management function component determines any of the NF component other than the second NF component as the alternative third NF component.

Therefore, the alternative NF component may be found in the at least one pre-stored component set, to receive the signaling sent by the user equipment, and the alternative NF component implements procedure message exchange.

With reference to the previous possible implementation of the first aspect, in another possible implementation of the first aspect, the NF repository management function component may pre-store at least one NF component set in the following manner.

The NF repository management function component receives an NF registration request message that includes an identifier of each NF component in the network in which the second NF component is located, an NF type corresponding to each NF component, and an identifier of a set to which each NF component belongs; generates at least one NF component set based on the NF registration request message, where each NF component set includes an NF component and an identifier of the NF component, and NF components included in a same NF component set have a same type and set identifier; and after generating the component set, sends an NF registration response message to each NF component.

Therefore, related information of each NF component (for example, the identifier of the component and the identifier of the set to which the component belongs) in the network may be pre-stored in the NF repository management function component, such that after receiving the NF discovery request message, the NF repository management function component finds the alternative NF component.

With reference to any one of the first aspect or the possible implementations of the first aspect, in another possible implementation of the first aspect, the second NF component may detect that the second NF component is faulty (for example, is overloaded).

When the second NF component detects that the second NF component is faulty, the NF repository management function component may receive an NF discovery request message sent by the second NF component; and after receiving the NF discovery request message and finding the alternative third NF component, the NF repository management function component sends the first message to the first NF component via the second NF component.

Therefore, the NF repository management function component may learn, via the message sent by the second NF component, that the second NF component is faulty, and notify, via the second NF component, the first NF component of a specific NF component that can replace the second NF component for working.

With reference to any one of the first aspect or the possible implementations of the first aspect, in another possible implementation of the first aspect, the first NF component may detect that the second NF component is faulty (for example, shuts down).

When the first NF component detects that the second NF component is faulty, the NF repository management function component may directly receive an NF discovery request message sent by the first NF component; and after receiving the NF discovery request message and finding the alternative third NF component, the NF repository management function component directly sends the first message to the first NF component.

Therefore, the NF repository management function component may learn, via the message sent by the first NF component, that the second NF component is faulty, and after determining the alternative NF component, directly notify the first NF component of a specific NF component that can replace the second NF component for working.

According to a second aspect, this application further provides a method for processing a network function NF component exception, where the method may be applied to a network including user equipment, a first NF component, and a second NF component, where the user equipment communicates with the second NF component via the first NF component, and the network further includes an NF repository management function component. The method may include: receiving, by the first NF component, a first message that includes an identifier of a third NF component and that is sent by the NF repository management function component, where the third NF component and the second NF component belong to a same NF component set, and NF components in a same NF component set have a same function; receiving, by the first NF component, signaling sent by the user equipment; and sending the signaling to the third NF component based on the identifier of the third NF component.

Therefore, when the second NF component is faulty (for example, is overloaded or shut downs), signaling may be sent to the third NF component that has a same function as the second NF component and that is determined by the NF repository management function component. Therefore, it is ensured that when the second NF component is faulty, a procedure message can still be properly exchanged between NF components, and network quality of service of the network is ensured.

With reference to the second aspect, in a possible implementation of the second aspect, before the first NF component receives the first message sent by the NF repository management function component, the first NF component may detect that the second NF component is faulty (for example, shuts down), and sends, to the NF repository management function component, an NF discovery request message that is used to request the NF repository management function component to query whether an alternative NF component exists in the network.

Therefore, the NF repository management function component may learn, via the message sent by the first NF component, that the second NF component is faulty, such that after receiving the message, the NF repository management function component determines the alternative NF component.

With reference to the second aspect, in a possible implementation of the second aspect, the second NF component may detect that the second NF component is faulty (for example, is overloaded). When the second NF component detects that the second NF component is faulty, the NF repository management function component receives an NF discovery request message sent by the second NF component, and the first NF component may receive, via the second NF component, the first message sent by the NF repository management function component.

Therefore, the NF repository management function component may learn, via the message sent by the second NF component, that the second NF component is faulty, and the first NF component learns of, via the second NF component, a specific NF component that can replace the second NF component for working.

With reference to any one of the second aspect or the possible implementations of the second aspect, in another possible implementation of the second aspect, the first NF component stores a context, of the second NF component, that includes an identifier of the second NF component and an identifier of at least one user equipment communicating with the second NF component, and the signaling sent by the user equipment includes an identifier of the user equipment. The method may further include: after receiving the first message that includes the identifier of the third NF component, updating, by the first NF component, the context of the second NF component based on the identifier of the third NF component, and creating a context of the third NF component; after receiving the signaling from the user equipment, searching, by the first NF component, a context of an NF component stored in the first NF component; finding an NF component corresponding to the identifier of the user equipment; and sending the signaling to the NF component. For example, if the identifier of the user equipment is included in the context of the third NF component, the first NF component may search the context of the third NF component based on the identifier of the user equipment, and send the signaling to the third NF component.

Therefore, a correspondence between user equipment and an NF component receiving signaling from the user equipment may be pre-stored in the first NF component, and when the signaling sent by the user equipment is received, the NF component receiving the signaling is found based on the correspondence, such that a signaling forwarding speed is increased.

According to a third aspect, this application further provides a method for processing a network function NF component exception, where the method may be applied to a network including user equipment, a first NF component, and a second NF component, the user equipment communicates with the second NF component via the first NF component, and the network further includes an NF repository management function component. The method may include: sending, by the second NF component to the NF repository management function component, an NF discovery request message that is used to request the NF repository management function component to query whether an alternative NF component exists in the network; receiving an NF discovery response message sent by the NF repository management function component, where the NF discovery response message includes an identifier of a third NF component; and sending, to the first NF component, a first message that is used to instruct the first NF component to send, to the third NF component, received signaling sent by the user equipment, where the first message may include the identifier of the third NF component.

Therefore, when the second NF component is faulty (for example, is overloaded or shut downs), the second NF component may send, to the NF repository management function component, a message that is used to determine an alternative NF component. After determining the alternative NF component, the NF repository management function component notifies the first NF component of a specific NF component that can replace the second NF component for working, such that the first NF component forwards, to the NF component, the received signaling sent by the user equipment. Therefore, it is ensured that when the second NF component is faulty, a procedure message can still be properly exchanged between NF components, and network quality of service of the network is improved.

With reference to the third aspect, in a possible implementation of the third aspect, before the second NF component sends the NF discovery request message to the NF repository management function component, the method may further include detecting, by the second NF component, that the second NF component is overloaded.

According to a fourth aspect, an embodiment of the present disclosure provides an NF repository management function component, where the NF repository management function component may include: a receiving unit configured to receive an NF discovery request message that is used to request the NF repository management function component to query whether an alternative NF component exists in a network in which a second NF component is located; and a determining unit configured to determine that an alternative third NF component exists in the network in which the NF repository management function component is located. The NF repository management function component may further include a sending unit configured to send, to a first NF component, a first message that includes an identifier of the third NF component and that is used to instruct the first NF component to send, to the third NF component, received signaling sent by user equipment.

For implementations of the fourth aspect, refer to functions for implementing operations of the NF repository management function component in the method for processing an NF component exception provided in any one of the first aspect or the possible implementations of the first aspect. Details are not described herein again. Therefore, the NF repository management function component provided in the fourth aspect may achieve same beneficial effects as that in the first aspect.

According to a fifth aspect, an embodiment of the present disclosure provides an NF repository management function component. The NF repository management function component may include: a communications interface configured to receive an NF discovery request message that is used to request the NF repository management function component to query whether an alternative NF component exists in a network in which a second NF component is located; and a processor configured to determine that an alternative third NF component exists in the network in which the NF repository management function component is located, where the communications interface is configured to send, to a first NF component, a first message that includes an identifier of the third NF component and that is used to instruct the first NF component to send, to the third NF component, received signaling sent by user equipment.

For implementations of the fifth aspect, refer to functions for implementing operations of the NF repository management function component in the method for processing an NF component exception provided in any one of the first aspect or the possible implementations of the first aspect. Details are not described herein again. Therefore, the NF repository management function component provided in the fifth aspect may achieve same beneficial effects as that in the first aspect. In addition, the apparatus may include a memory. The memory is configured to be coupled to the processor, and the memory stores a program instruction and data that are necessary for the apparatus.

According to a sixth aspect, an embodiment of the present disclosure provides a nonvolatile computer readable storage medium storing one or more programs, where the one or more programs include an instruction. When the instruction is executed by the NF repository management function component according to any one of the fourth aspect or the possible implementations of the fourth aspect or according to any one of the fifth aspect or the possible implementations of the fifth aspect, the NF repository management function component executes the following event: receiving an NF discovery request message that is used to request the NF repository management function component to query whether an alternative NF component exists in a network in which a second NF component is located; determining that an alternative third NF component exists in the network in which the NF repository management function component is located; and sending, to a first NF component, a first message that includes an identifier of the third NF component and that is used to instruct the first NF component to send, to the third NF component, received signaling sent by user equipment.

For implementations of the sixth aspect, refer to functions for implementing operations of the NF repository management function component in the method for processing an NF component exception provided in any one of the first aspect or the possible implementations of the first aspect. Details are not described herein again.

According to a seventh aspect, an embodiment of the present disclosure provides a first NF component, where the first NF component may include: a receiving unit configured to receive a first message that includes an identifier of a third NF component and that is sent by an NF repository management function component, where the third NF component and a second NF component belong to a same NF component set, NF components in a same NF component set have a same function, and the second NF component is configured to receive signaling sent by user equipment, where the receiving unit is further configured to receive the signaling sent by the user equipment; and a sending unit configured to send the signaling to the third NF component based on the identifier of the third NF component.

For implementations of the seventh aspect, refer to functions for implementing operations of the first NF component in the method for processing an NF component exception provided in any one of the second aspect or the possible implementations of the second aspect. Details are not described herein again. Therefore, the first NF component provided in the seventh aspect may achieve same beneficial effects as that in the second aspect.

According to an eighth aspect, an embodiment of the present disclosure provides a first NF component, where the first NF component may include a communications interface configured to: receive a first message that includes an identifier of a third NF component and that is sent by an NF repository management function component, where the third NF component and a second NF component belong to a same NF component set, NF components in a same NF component set have a same function, and the second NF component is configured to receive signaling sent by user equipment; and receive the signaling sent by the user equipment; and a processor, configured to send the signaling to the third NF component based on the identifier of the third NF component via the communications interface.

For implementations of the eighth aspect, refer to functions for implementing operations of the first NF component in the method for processing an NF component exception provided in any one of the second aspect or the possible implementations of the second aspect. Details are not described herein again. Therefore, the first NF component provided in the eighth aspect may achieve same beneficial effects as that in the second aspect. In addition, the apparatus may include a memory. The memory is configured to be coupled to the processor, and the memory stores a program instruction and data that are necessary for the apparatus.

According to a ninth aspect, an embodiment of the present disclosure provides a nonvolatile computer readable storage medium storing one or more programs, where the one or more programs include an instruction. When the instruction is executed by the first NF component according to any one of the seventh aspect or the possible implementations of the seventh aspect or according to any one of the eighth aspect or the possible implementations of the ninth aspect, the first NF component executes the following event: receiving a first message that includes an identifier of a third NF component and that is sent by an NF repository management function component, where the third NF component and a second NF component belong to a same NF component set, NF components in a same NF component set have a same function, and the second NF component is configured to receive signaling sent by user equipment; receiving the signaling sent by the user equipment; and sending the signaling to the third NF component based on the identifier of the third NF component via a communications interface.

For implementations of the ninth aspect, refer to functions for implementing operations of the first NF component in the method for processing an NF component exception provided in any one of the second aspect or the possible implementations of the second aspect. Details are not described herein again. Therefore, the first NF component provided in the ninth aspect may achieve same beneficial effects as that in the second aspect.

According to a tenth aspect, an embodiment of the present disclosure provides a second NF component, where the second NF component may include: a sending unit configured to send, to an NF repository management function component, an NF discovery request message that is used to request the NF repository management function component to query whether an alternative NF component exists in a network in which the second NF component is located; and a receiving unit configured to receive an NF discovery response message that includes an identifier of a third NF component and that is sent by the NF repository management function component. The sending unit is further configured to send, to a first NF component, a first message that includes the identifier of the third NF component and that is used to instruct the first NF component to send, to the third NF component, received signaling sent by the user equipment.

For implementations of the tenth aspect, refer to functions for implementing operations of the second NF component in the method for processing an NF component exception provided in any one of the third aspect or the possible implementations of the third aspect. Details are not described herein again. Therefore, the second NF component provided in the tenth aspect may achieve same beneficial effects as that in the third aspect.

According to an eleventh aspect, an embodiment of the present disclosure provides a second NF component, where the second NF component may include a communications interface configured to: send, to an NF repository management function component, an NF discovery request message that is used to request the NF repository management function component to query whether an alternative NF component exists in a network in which the second NF component is located; and receive an NF discovery response message that includes an identifier of a third NF component and that is sent by the NF repository management function component, and send, to a first NF component, a first message that includes the identifier of the third NF component and that is used to instruct the first NF component to send, to the third NF component, received signaling sent by the user equipment.

For implementations of the eleventh aspect, refer to functions for implementing operations of the second NF component in the method for processing an NF component exception provided in any one of the third aspect or the possible implementations of the third aspect. Details are not described herein again. Therefore, the second NF component provided in the eleventh aspect may achieve same beneficial effects as that in the third aspect. In addition, the apparatus may include a memory. The memory is configured to be coupled to a processor, and the memory stores a program instruction and data that are necessary for the apparatus.

According to a twelfth aspect, an embodiment of the present disclosure provides a nonvolatile computer readable storage medium storing one or more programs, where the one or more programs include an instruction. When the instruction is executed by the second NF component according to any one of the eighth aspect or the possible implementations of the eighth aspect or according to any one of the ninth aspect or the possible implementations of the ninth aspect, the second NF component executes the following event: sending, to an NF repository management function component, an NF discovery request message that is used to request the NF repository management function component to query whether an alternative NF component exists in a network in which the second NF component is located; receiving an NF discovery response message that includes an identifier of a third NF component and that is sent by the NF repository management function component; and sending, to a first NF component, a first message that includes the identifier of the third NF component and that is used to instruct the first NF component to send, to the third NF component, received signaling sent by the user equipment.

For implementations of the twelfth aspect, refer to functions for implementing operations of the second NF component in the method for processing an NF component exception provided in any one of the third aspect or the possible implementations of the third aspect. Details are not described herein again. Therefore, the second NF component provided in the twelfth aspect may achieve same beneficial effects as that in the third aspect.

According to a thirteenth aspect, an embodiment of the present disclosure provides a system for processing an NF component exception, including the NF repository management function component according to any one of the fourth aspect or the implementations of the fourth aspect or according to any one of the fifth aspect or the implementations of the fifth aspect or according to any one of the sixth aspect or the implementations of the sixth aspect, the first NF component according to any one of the seventh aspect or the implementations of the seventh aspect or according to any one of the eighth aspect or the implementations of the eighth aspect or according to any one of the ninth aspect or the implementations of the ninth aspect, and the second NF component according to any one of the tenth aspect or the implementations of the tenth aspect or according to any one of the eleventh aspect or the implementations of the eleventh aspect or according to any one of the twelfth aspect or the implementations of the twelfth aspect.

The system for processing an NF component exception provided in the thirteenth aspect may implement the foregoing method for processing an NF component exception, and therefore can achieve same beneficial effects as the foregoing method for processing an NF component exception.

According to a fourteenth aspect, this application provides a method for processing a network function NF component exception, including: receiving, by an NF repository management function component, a set identifier of a second NF component sent by a first network element, to request to query an alternative NF component; finding, by the NF repository management function component, an identifier of an alternative third NF component based on the set identifier of the second NF component, where the third NF component and the second NF component belong to a same NF component set; and sending, by the NF repository management function component, the identifier of the third NF component to the first network element.

In a possible design, finding, by the NF repository management function component, an identifier of an alternative third NF component based on the set identifier of the second NF component includes: learning of, by the NF repository management function component based on the set identifier of the second NF component, an NF component set to which the second NF component belongs, and selecting, as the alternative third NF component, one or more NF components from the NF component set to which the second NF component belongs.

In a possible design, the first network element is a first NF component, the second NF component, or an access network.

In a possible design, when the first network element is an access network, receiving, by an NF repository management function component, a set identifier of a second NF component sent by a first network element includes: receiving, by the NF repository management function component, the set identifier of the second NF component sent by the access network via an NF discovery management function; and the sending, by the NF repository management function component, the identifier of the third NF component to the first network element includes: sending, by the NF repository management function component, the identifier of the third NF component to the access network via the NF discovery management function.

In a possible design, when the first network element is the second NF component, the method further includes sending, by the second NF component, the identifier of the third NF component to an access network.

In a possible design, the method further includes receiving, by the NF repository management function component, a registration request message from a network management function server or an NF component, where the registration request message includes an identifier of an NF component and a set identifier of the NF component.

In a possible design, the NF component includes the second NF component and the third NF component.

According to a fifteenth aspect, this application provides a method for processing a network function NF component exception, including: learning, by a first network element, that a second NF component cannot provide a service; obtaining, by the first network element, a set identifier of the second NF component, and sending the set identifier of the second NF component to an NF repository management function component, to request to query an alternative NF component; receiving, by the first network element, an identifier of an alternative third NF component returned by the NF repository management function component, where the third NF component and the second NF component belong to a same NF component set; and determining, by the first network element, that the third NF component provides a service for user equipment.

In a possible design, obtaining, by the first network element, a set identifier of the second NF component includes: locally obtaining the set identifier of the second NF component; or receiving, by the first network element, a message sent by the user equipment, where the message carries the set identifier of the second NF component, and obtaining the set identifier of the second NF component carried in the message.

In a possible design, the first network element is a first NF component, the second NF component, or an access network.

In a possible design, when the first network element is an access network, sending, by the first network element, the set identifier of the second NF component to an NF repository management function component includes: sending, by the access network, the set identifier of the second NF component to the NF repository management function component via an NF discovery management function; and receiving, by the first network element, an identifier of an alternative third NF component returned by the NF repository management function component includes: receiving, by the access network via the NF discovery management function, the identifier of the alternative third NF component returned by the NF repository management function component.

In a possible design, when the first network element is the second NF component, the method further includes sending, by the second NF component, the identifier of the third NF component to the access network.

In a possible design, determining, by the first network element, that the third NF component provides a service for user equipment includes: obtaining, by the first network element, information to be sent to the second NF component; and sending, by the first network element to the third NF component, the information to be sent to the second NF component.

In a possible design, determining, by the first network element, that the third NF component provides a service for user equipment includes updating, by the first network element, a correspondence between the user equipment and the second NF component to a correspondence between the user equipment and the third NF component.

According to a sixteenth aspect, an embodiment of the present disclosure provides an NF repository management function component, where the NF repository management function component has functions for implementing operations of the NF repository management function component in the foregoing method examples. The functions may be implemented by hardware, or may be implemented by executing corresponding software by hardware. The hardware or the software includes one or more modules corresponding to the foregoing functions.

In a possible design, a structure of the NF repository management function component includes a processing unit, a sending unit, and a receiving unit. The processing unit is configured to support the NF repository management function component in executing a corresponding function in the foregoing method. The sending unit and the receiving unit are configured to support the NF repository management function component in communicating with another device. The NF repository management function component may further include a storage unit. The storage unit is configured to be coupled to the processing unit, and the storage unit stores a program instruction and data that are necessary for the NF repository management function component. For example, the processing unit may be a processor, the sending unit and the receiving unit may be a transceiver, and the storage unit may be a memory.

According to a seventeenth aspect, an embodiment of the present disclosure provides a first network element, where the first network element has functions for implementing operations of the first network element in the foregoing method examples. The functions may be implemented by hardware, or may be implemented by executing corresponding software by hardware. The hardware or the software includes one or more modules corresponding to the foregoing functions.

In a possible design, a structure of the first network element includes a processing unit, a sending unit, and a receiving unit. The processing unit is configured to support the first network element in executing a corresponding function in the foregoing method. The sending unit and the receiving unit are configured to support the first network element in communicating with another device. The first network element may further include a storage unit. The storage unit is configured to be coupled to the processing unit, and the storage unit stores a program instruction and data that are necessary for the first network element. For example, the processing unit may be a processor, the sending unit and the receiving unit may be a transceiver, and the storage unit may be a memory.

According to an eighteenth aspect, an embodiment of the present disclosure provides a communications system, where the system includes the NF repository management function component according to the foregoing aspect. In another possible design, the system may further include another device that interacts with the NF repository management function and that is in solutions provided in the embodiments of the present disclosure, for example, a first network element, a second NF component, and/or a third NF component.

According to a nineteenth aspect, an embodiment of the present disclosure provides a communications system, where the system includes the first network element according to the foregoing aspect. In another possible design, the system may further include another device that interacts with the first network element and that is in solutions provided in the embodiments of the present disclosure, for example, a second NF component, a third NF component, and/or an NF repository management function.

According to a twentieth aspect, an embodiment of the present disclosure provides a computer storage medium, where the computer storage medium is configured to store a computer software instruction used by the foregoing core network device, and the computer software instruction includes a program designed for executing the foregoing aspect.

According to a twenty-first aspect, an embodiment of the present disclosure provides a computer storage medium, where the computer storage medium is configured to store a computer software instruction used by the foregoing first network element, and the computer software instruction includes a program designed for executing the foregoing aspect.

According to a twenty-second aspect, this application further provides a computer program product that includes an instruction, where when the instruction runs on a computer, the computer executes the method according to the foregoing aspects.

According to a twenty-third aspect, this application provides a chip system, where the chip system includes a processor, configured to support a data sending device in implementing functions in the foregoing aspects, for example, generating or processing data and/or information in the foregoing method. In a possible design, the chip system further includes a memory, where the memory is configured to store a program instruction and data that are necessary for the data sending device. The chip system may include a chip, or may include a chip and another discrete device.

BRIEF DESCRIPTION OF DRAWINGS

FIG. 1a-1 and FIG. 1a-2 are a schematic diagram of another network architecture according to an embodiment of the present disclosure;

FIG. 2 is a schematic diagram of another network architecture according to an embodiment of the present disclosure;

FIG. 3-1 and FIG. 3-2 are a flowchart of a method for processing an NF component exception according to an embodiment of the present disclosure;

DESCRIPTION OF EMBODIMENTS

Figure 1:
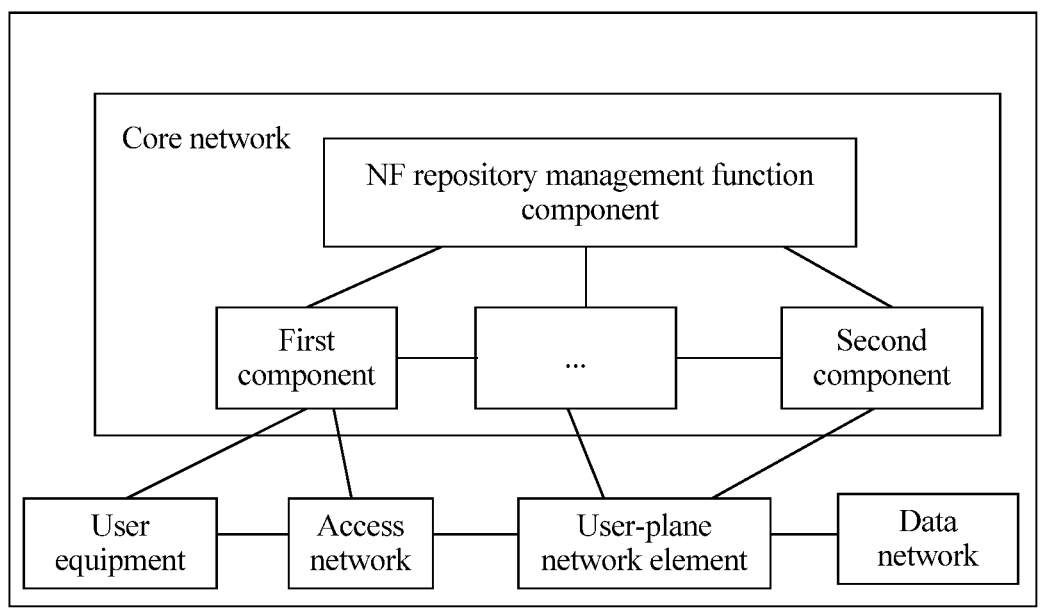
FIG. 1 is a schematic diagram of a network architecture according to an embodiment of the present disclosure.

A main principle of the present disclosure is as follows. An NF repository management function component is added to a core network, and a plurality of NF components of a same type (for example, components of a same NF type, or components sharing a same user context, or components sharing a same network configuration) are used as a set that is pre-stored in the NF repository management function component, such that when an exception occurs in an NF component, a new NF component is selected from a set to which the NF component belongs in the NF repository management function component to complete partial or all working of the NF component in which an exception occurs, to ensure that a procedure message is properly exchanged between NF components.

The following describes the technical solutions in the embodiments of the present disclosure clearly with reference to accompanying drawings in the embodiments of the present disclosure. In descriptions of the embodiments of the present disclosure, it should be understood that, a system or an element indicated using terms such as "first", "second", and "another" is a system or an element that is described based on the embodiments and that has a particular function, and is used only for describing the present disclosure and for description simplicity, but does not indicate or imply that the indicated system or element needs to have the name, and therefore should not be construed as a limitation on the present disclosure.

Before the solutions are described in detail, to facilitate understanding of the technical solutions in the present disclosure, some nouns in the present disclosure are explained in detail. It should be understood that, the following nouns are named by persons skilled in the present disclosure only for convenience of description, do not represent or imply that an indicated system or element needs to have the name, and therefore should not be construed as a limitation on the present disclosure.

An NF component is a component obtained after a network element in a core network is split based on function types, where each NF component corresponds to one or more NF types; or is a new NF component introduced to implement an NF. The NF component may be an application program used to implement an NF corresponding to the NF component, and the application program may be deployed on an application platform or a server for being invoked by the server or another device to execute the NF corresponding to the NF component. Alternatively, the NF component may be a function module that is independently deployed in the core network. This is not limited in the embodiments of the present disclosure. Only an example in which the NF component is a function module deployed in the core network is used for description in the embodiments of the present disclosure. NF components may have different names based on network functions corresponding to the NF components, to distinguish between the NF components. For example, an NF component having a Session Management (SM) function may be referred to as an SM component, an NF component having a Mobility Management (MM) function may be referred to as an MM component, and an NF component having a Small Data (SD) function may be referred to as an SD component. The SM component is responsible for managing a Protocol Data Unit (PDU) session connection of user equipment, including establishment, update, deletion, and the like of the PDU session connection. The MM component is responsible for transferring messages related to a PDU session between the SM component and the user equipment and that between the SM component and an access network. The MM component is responsible for network access management of the user equipment, location management of the user equipment, reachability management of the user equipment, and the like.

An NF component exception means that an NF component is faulty or is overloaded.

An NF component fault may mean that an NF component cannot operate because the NF component shuts down, for example, cannot receive or send a message exchanged with another NF component.

NF component overload may mean: load (such as a quantity of received messages) on an NF component is greater than or equal to a preset threshold, or load on a Central Processing Unit (CPU) on an NF component is greater than or equal to a preset threshold, or memory consumption of an NF component is greater than or equal to a preset threshold. The preset threshold may be set as required. This is not limited in the embodiments of the present disclosure.

A method for processing an NF component exception in the embodiments of the present disclosure may be applied to a network system shown in FIG. 1. As shown in FIG. 1, the network may include User Equipment (UE), an Access Network (AN), a User Plane (UP) network element, a Data Network (DN), a plurality of NF components (such as a first NF component and a second NF component), and an NF repository management function component. The plurality of NF components and the NF repository management function component are located in a core network of the network. The user equipment accesses the data network via the access network. The access network may be an enhanced Long Term Evolution (LTE) or an evolved Long Term Evolution (eLTE) network, or may be a next generation (NextGen) radio access network (RAN) such as a 3rd Generation Partnership Project (3GPP) access network, or may be an access network such as a Wireless Local Area Network (WLAN) or a fixed access network. The user-plane network element is mainly responsible for forwarding user service data. The NF component is mainly responsible for connection management, security authentication, mobility management, location management, and the like of the user equipment. Different NF components may exchange procedure messages with each other, to implement a network function of the core network. The NF repository management function component is mainly configured to store related information of each NF component (such as an address of the NF component, an identifier of a set to which the NF component belongs, and a type of the NF component) in the core network.

It should be noted that, FIG. 1 is only a schematic diagram, the NF component shown in FIG. 1 is only an example, a quantity of NF components imposes no limitation on the solutions of this application, and the quantity of NF components is not limited to the quantity shown in FIG. 1. In actual deployment, a plurality of NF components different from those shown in FIG. 1 may be deployed in the network. Although not shown, the core network shown in FIG. 1 may further include some other control-plane network elements. Details are not described herein.

Figures 1, 1A:
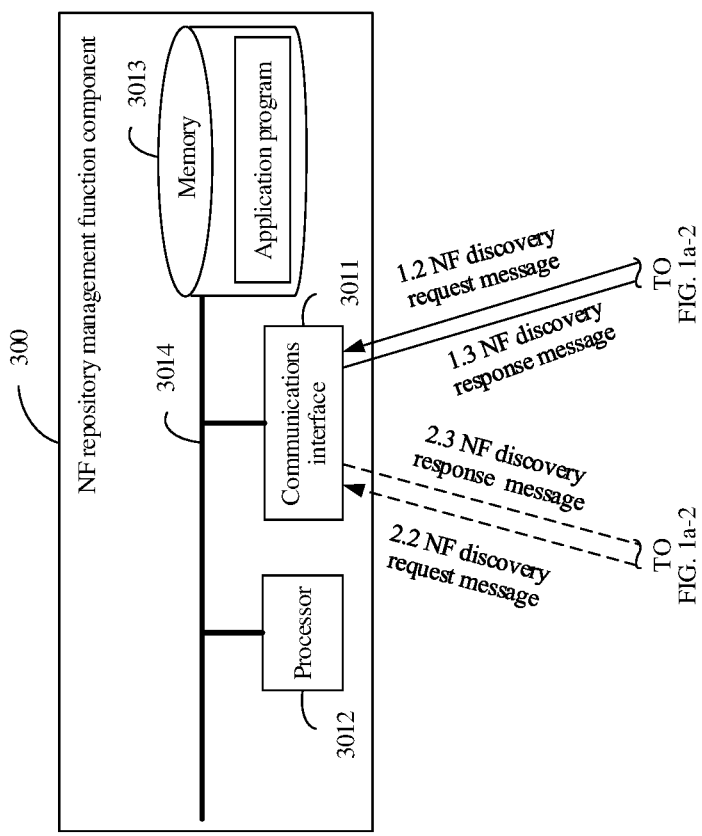
Figures 1, 1A, 2:
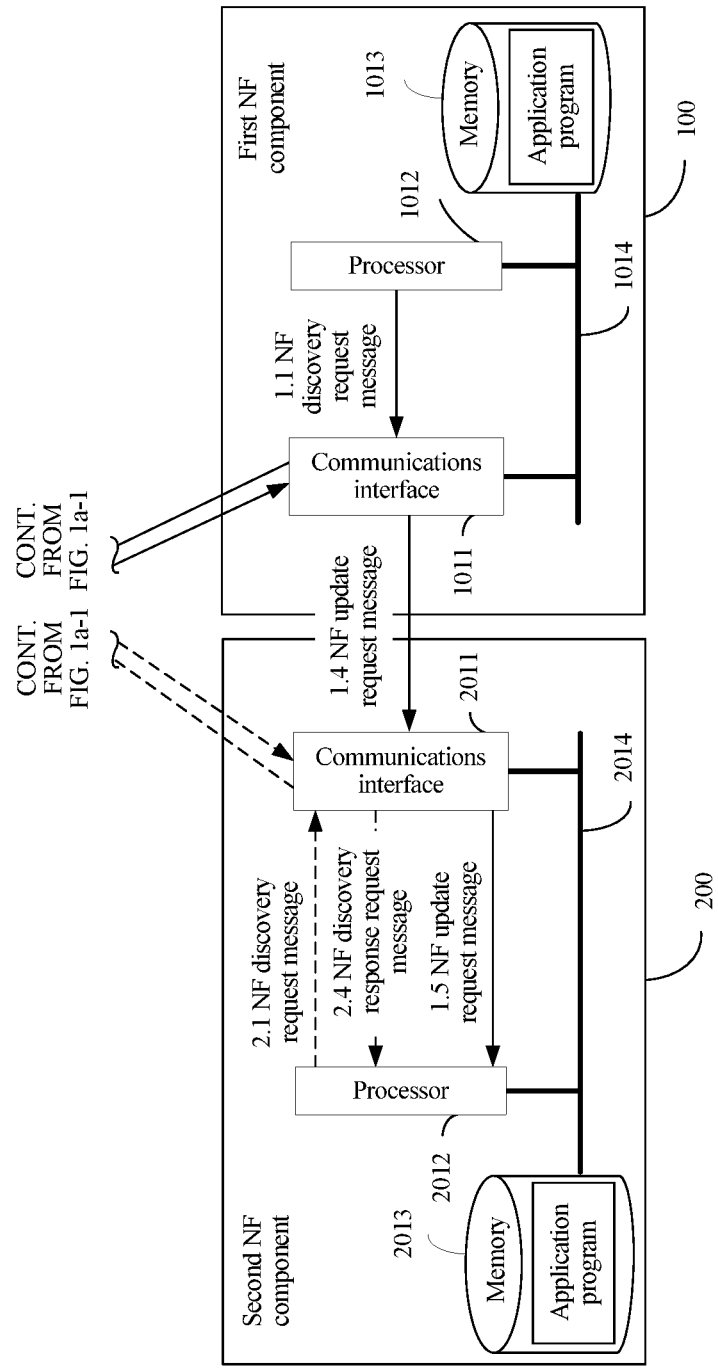
Figure 2:
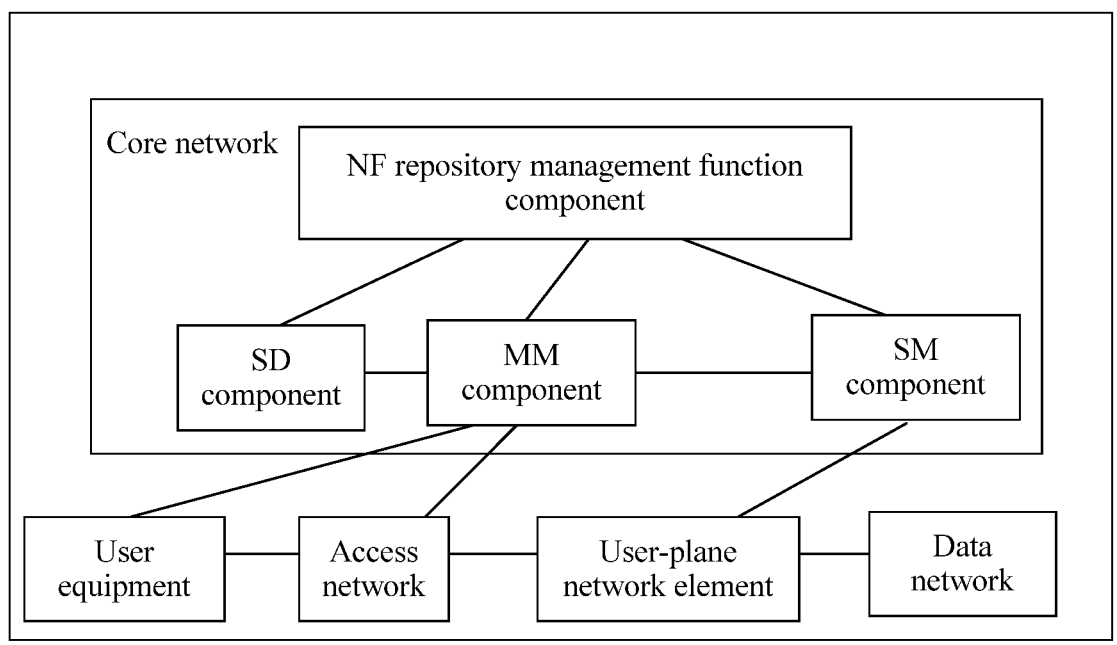

Main network elements executing the solutions provided in the embodiments of the present disclosure are described in detail below with reference to FIG. 1a-1 and FIG. 1a-2. As shown in FIG. 1a-1 and FIG. 1a-2, a first NF component 100 in FIG. 1a-1 and FIG. 1a-2 may include a communications interface 1011, a processor 1012, a memory 1013, and at least one communications bus 1014. The communications bus 1014 is configured to implement connections between these apparatuses and mutual communication thereof. A second NF component 200 may include a communications interface 2011, a processor 2012, a memory 2013, and at least one communications bus 2014. The communications bus 2014 is configured to implement connections between these apparatuses and mutual communication thereof. An NF repository management function component 300 may include a communications interface 3011, a processor 3012, a memory 3013, and at least one communications bus 3014. The communications bus 3014 is configured to implement connections between these apparatuses and mutual communication thereof.

The communications interface 1011 is a transceiver unit of the first NF component 100, and is configured to exchange signaling or a message with an external network element. For example, the communications interface 1011 of the first NF component 100 may receive control signaling sent by user equipment, or forward control signaling to the second NF component 200.

The communications interface 2011 is a transceiver unit of the second NF component 200, and is configured to exchange signaling or a message with an external network element. For example, the communications interface 2011 may receive control signaling sent by the communications interface 2011 of the first NF component 100, or send a request message to the NF repository management function component 300.

The communications interface 3011 is a transceiver unit of the NF repository management function component 300, and is configured to exchange a message with an external network element. For example, the communications interface 3011 may receive a request message sent by the communications interface 1011 of the first NF component 100 or the communications interface 2011 of the second NF component 200, or send a response message to the first NF component 100 or the second NF component 200.

The processor 1012, the processor 2012, and the processor 3012 each may be a Central Processing Unit (CPU), or may be an Application Specific Integrated Circuit (ASIC), or may be one or more integrated circuits configured to implement the embodiments of the present disclosure, for example, one or more microprocessors, or one or more Digital Signal Processors (DSPs), or one or more Field Programmable Gate Arrays (FPGAs).

The memory 1013, the memory 2013, and the memory 3013 each may be a volatile memory such as a Random-Access Memory (RAM); or may be a non-volatile memory such as a Read-Only Memory (ROM), a flash memory, a hard disk such as a Hard Disk Drive (HDD), or a Solid-State Drive (SSD); or may be a combination of the foregoing types of memories. The memory 1013, the memory 2013, and the memory 3013 may be configured to store data and code. In this way, the processor 1012 runs or executes the program code stored in the memory 1013 and invokes the data stored in the memory 1013, to implement various functions of the first NF component 100; the processor 2012 runs or executes the program code stored in the memory 2013 and invokes the data stored in the memory 2013, to implement various functions of the second NF component 200; the processor 3012 runs or executes the program code stored in the memory 3013 and invokes the data stored in the memory 3013, to implement various functions of the NF repository management function component 300.

The communications bus 1014, the communications bus 2014, and the communications bus 3014 each may be classified into an address bus, a data bus, a control bus, and the like, and may be an Industry Standard Architecture (ISA) bus, a peripheral component interconnect (PCI) bus, an Extended Industry Standard Architecture (EISA) bus, or the like. For ease of denotation, each communications bus is indicated using only one thick line in FIG. 1a-1 and FIG. 1a-2. However, it does not indicate that there is only one bus or only one type of bus.

In a process of processing an NF component exception provided in the embodiments of the present disclosure, as shown in 1.1 to 1.5 in FIG. 1a-1 and FIG. 1a-2, after determining that an exception (such as overload) occurs in the second NF component 200, and determining that load balancing needs to be performed, the processor 2012 of the second NF component 200 generates an NF discovery request message, and sends the NF discovery request message to the communications interface 3011 of the NF repository management function component 300 via the communications interface 2011. The processor 3012 of the NF repository management function component 300 searches for, based on the NF discovery request message received by the communications interface 3011, another NF component (a third NF component) having a same function as the second NF component, determines that the other NF component having a same function as the second NF component shares load on the second NF component 200, and returns an NF discovery response message to the second NF component 200 via the communications interface 3011. After receiving the NF discovery response message, the communications interface 2011 sends an update request message to the communications interface 1011 of the first NF component 100. The processor 1012 of the first NF component 100 forwards, based on the update request message received by the communications interface 1011, partial received signaling to the other NF component (the third NF component) for processing, where the signaling is sent by the user equipment.

Alternatively, as shown by dashed lines in FIG. 1a-1 and FIG. 1a-2, when determining that an exception (such as shutdown) occurs in the second NF component 200 and the second NF component 200 cannot operate, the processor 1012 of the first NF component 100 generates an NF discovery request message, and sends the NF discovery request message to the communications interface 3011 of the NF repository management function component 300 via the communications interface 1011. The processor 3012 of the NF repository management function component 300 searches for, based on the NF discovery request message received by the communications interface 3011, another NF component having a same function as the second NF component, determines that the other available NF component having a same function as the second NF component, to complete working of the second NF component 200, and returns an NF discovery response message to the first NF component 100 via the communications interface 3011. After the communications interface 1011 receives the NF discovery response message, the processor 1012 forwards, based on the NF discovery response message received by the communications interface 1011, all received signaling to the other NF component for processing, where the signaling is sent by the user equipment.

Therefore, when an exception occurs in an NF component, another NF component having a same function as the NF component may process partial or all signaling sent by user equipment, such that a signaling message is properly exchanged between NF components, and network quality of service of a network is well ensured. In actual application, the first NF component shown in FIG. 1 and FIG. 1a-1 and FIG. 1a-2 may be an MM component, and the second NF component may be an SM component or an SD component.

For example, as shown in FIG. 2, the network system may include user equipment, an access network, a user-plane network element, a data network, an MM component, an SM component, and an SD component. The user equipment, the MM component, and the SM component may exchange a message or signaling with each other, to complete processing of a Protocol Data Unit (PDU) session of the user equipment. In addition, if an exception occurs in the SM component during a session, the solutions provided in the embodiments of the present disclosure may be used to ensure that the MM component exchanges a message or signaling with another available SM component, to ensure that a PDU session is properly performed. The SD component, the MM component, and the user equipment may also exchange a message or signaling with each other, to provide a small data service for the user equipment. When an exception occurs in the SD component, similarly, the solutions provided in the embodiments of the present disclosure may also be used to ensure that the MM component exchanges a message or signaling with another available SD component, such that the other SD component continues to provide a small data service for the user equipment, to avoid service interruption and improve network quality of service of the network. In addition, it may be understood that, the second NF component may be another NF component (not shown in FIG. 2) such as a Multimedia Broadcast Multicast Service (MBMS) component, a policy component, or a subscriber data component. When the second NF component is an NF component other than the SM component or the SD component, the solutions provided in the embodiments of the present disclosure may also be used to resolve a problem that occurs when an exception occurs in the component.

For ease of description, the following embodiments use an example shown in FIG. 2 in which the first NF component is an MM component and the second NF component is an SM component or an SD component, and show, using steps, and describe in detail the process of processing an NF component exception provided in the embodiments of the present disclosure. The shown steps may also be performed in a computer system that can execute a group of instructions. In addition, although a logical sequence is shown in the figure, in some cases, the shown or described steps may be performed in a sequence different from the sequence herein.

Figures 1, 3:
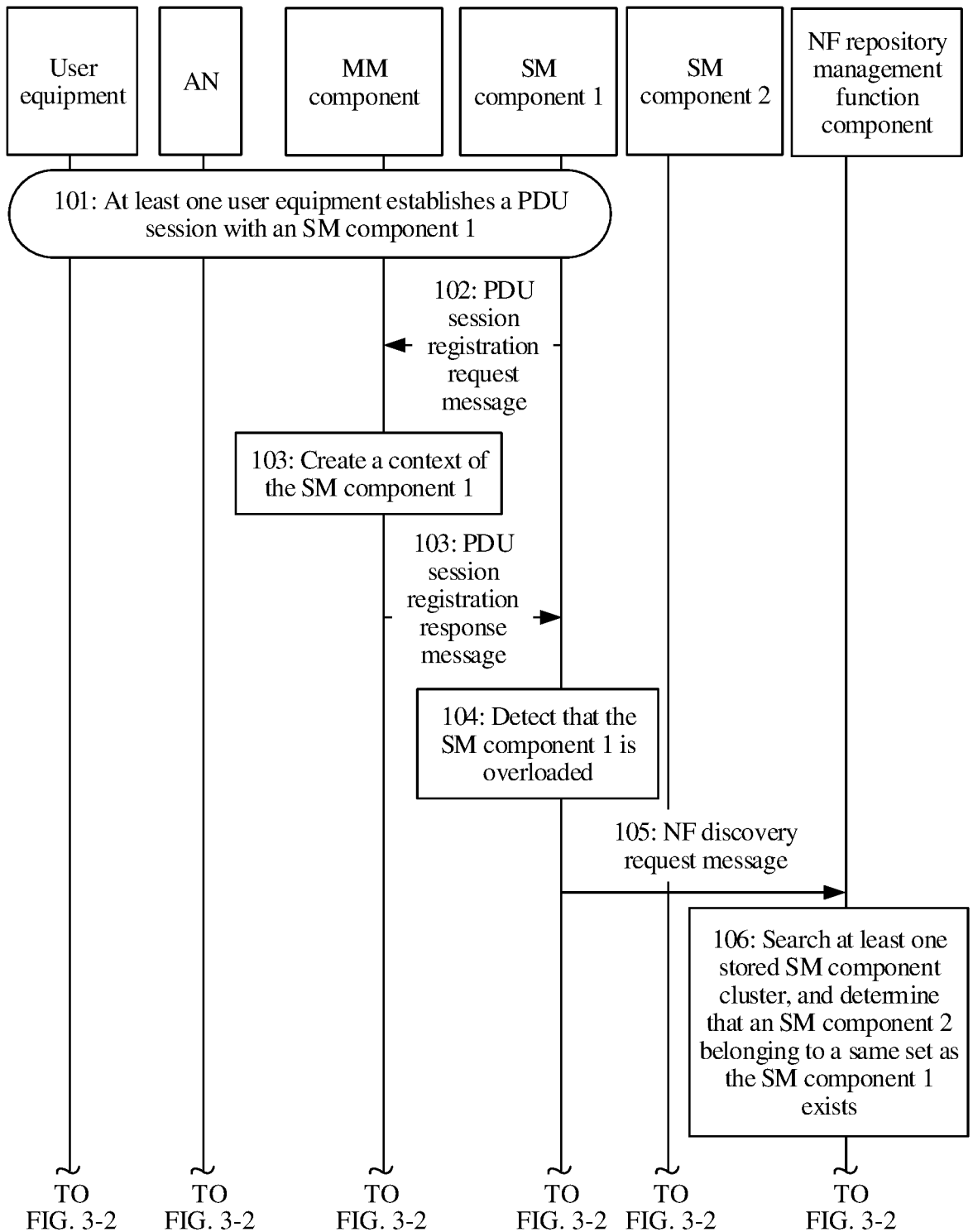
Figures 2, 3:
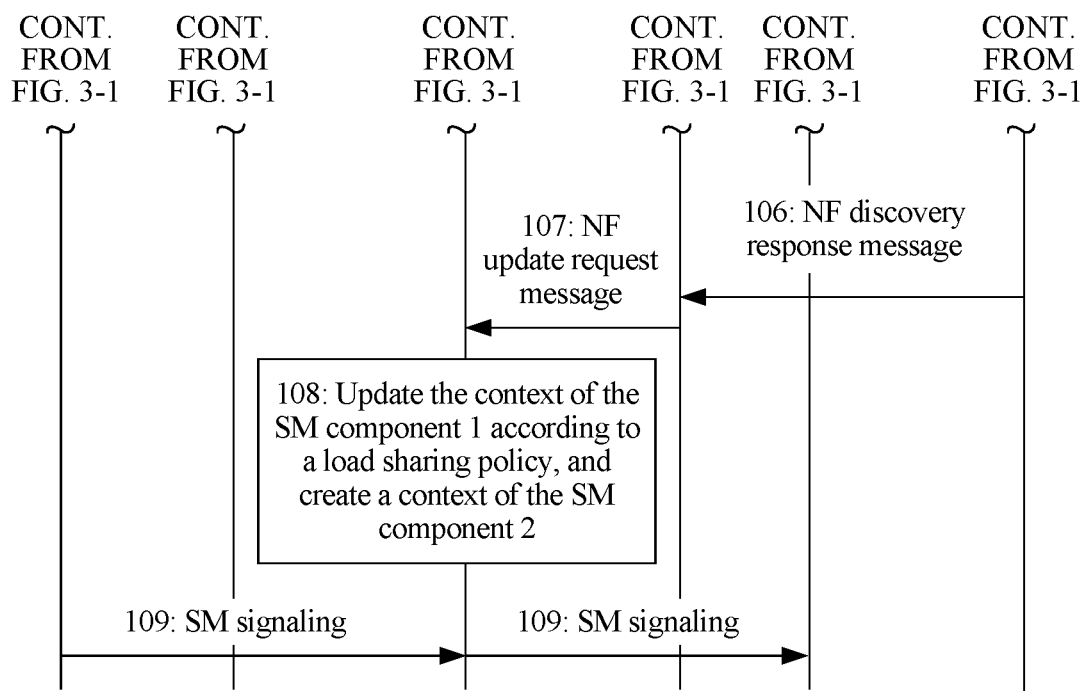

FIG. 3-1 and FIG. 3-2 are a flowchart of a method for processing an NF component exception according to an embodiment of the present disclosure. The method is executed through interaction between devices in the network shown in FIG. 2, and is used to resolve a problem that an SM component is overloaded in a process in which user equipment performs a session with the SM component. As shown in FIG. 3-1 and FIG. 3-2, the method may include the following steps.

Step 101: At least one user equipment establishes a PDU session with an SM component 1.

Each user equipment may establish a PDU session with the SM component 1 via an AN or an MM component, this process is an existing process, and details are not described herein. It should be noted that, for ease of description, FIG. 3-1 and FIG. 3-2 show only a process in which one user equipment establishes a PDU session with the SM component 1 and executes the solution shown in FIG. 3-1 and FIG. 3-2, and a quantity of UEs therein imposes no limitation on the solution of this application. Each user equipment may execute the solution shown in FIG. 3-1 and FIG. 3-2. Details are not described herein.

Step 102: The SM component 1 sends a PDU session registration request message to an MM component.

The PDU session registration request message may include an identifier of the user equipment establishing the PDU session with the SM component 1, an identifier of the PDU session connection, an identifier of the SM component 1, and an identifier of a set to which the SM component 1 belongs.

Step 103: The MM component receives the PDU session registration request message, creates and stores a context of the PDU session connection, and returns a PDU session registration response message to the SM component 1.

A correspondence among the session identifier of the PDU session connection, the identifier of the user equipment, and the identifier of the SM component 1 is recorded in the context of the PDU session connection.

The PDU session registration response message is used to notify the SM component 1 that PDU session registration is completed.

The session identifier of the PDU session is used to identify the PDU session. The identifier of the user equipment is used to uniquely identify the user equipment, and the identifier may be an International Mobile Subscriber Identity (IMSI). The identifier of the SM component 1 is used to uniquely identify the SM component 1.

Step 104: The SM component 1 detects that the SM component 1 is overloaded.

Optionally, the SM component 1 may detect whether a quantity of messages received by the SM component 1 is greater than or equal to a preset threshold, and if the quantity is greater than or equal to the preset threshold, the SM component 1 determines that the SM component 1 is overloaded and needs to perform load balancing.

Alternatively, the SM component 1 detects whether load on a CPU of the SM component 1 is greater than or equal to a preset threshold, and if the load is greater than or equal to the preset threshold, the SM component 1 determines that the SM component 1 is overloaded and needs to perform load balancing.

Alternatively, the SM component 1 detects whether memory consumption (such as memory usage) of the SM component 1 is greater than or equal to a preset threshold, and if the memory consumption is greater than or equal to the preset threshold, the SM component 1 determines that the SM component 1 is overloaded and needs to perform load balancing.

The preset threshold may be set as required. This is not limited in this embodiment of the present disclosure.

Step 105: The SM component 1 sends an NF discovery request message to an NF repository management function component.

The NF discovery request message is used to request the NF repository management function component to query whether an alternative SM component exists in a network in which the SM component 1 is located.

The alternative SM component may be an SM component that has a same function as the SM component 1 and that is in a same SM component set as the SM component 1.

The NF discovery request message may include the identifier of the set to which the SM component 1 belongs, or may include the identifier of the SM component 1.

The NF repository management function component pre-stores at least one SM component set. Each SM component set includes at least one SM component, one SM component corresponds to one identifier, and SM components in a same SM component set have a same network function. The NF repository management function component may store the at least one SM component set in a form of a table, or may store the at least one SM component set in another form. This is not limited in this embodiment of the present disclosure.

Figure 3A:
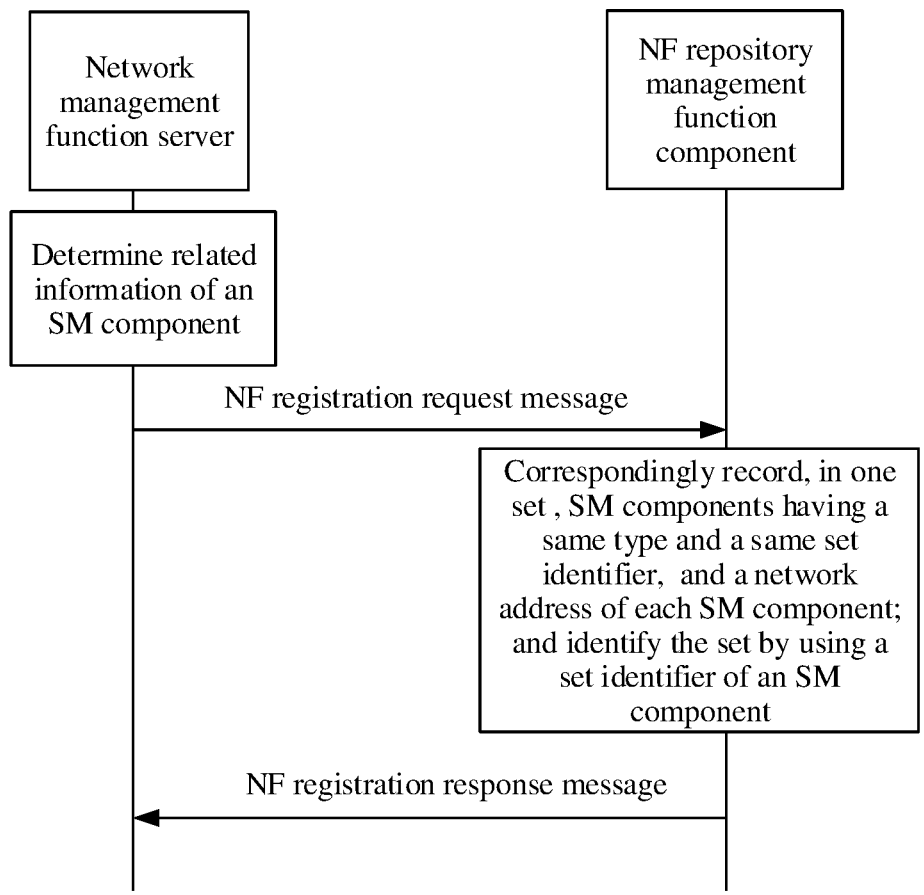
FIG. 3a is a flowchart of storing, by an NF repository management function component, related information of an NF component according to an embodiment of the present disclosure.

Optionally, a solution shown in FIG. 3a may be used to store at least one SM component set in the NF repository management function component. As shown in FIG. 3a, a network management function server deploys and manages each SM component in the network, determines related information of each SM component, such as an identifier of the SM component, an NF type corresponding to the SM component, and an identifier of a set to which the SM component belongs, and sends an NF registration request message to the NF repository management function component. The NF registration request message includes the related information of each SM component. After receiving the registration request message, the NF repository management function component correspondingly records, in one set, SM components having a same NF type and a same set identifier, and an identifier of each SM component; identifies the set using an identifier of the set to which an SM component belongs; and sends an NF registration response message to the network management function server. In this way, the NF repository management function component completes storage of information about an SM component set.

Figure 3B:
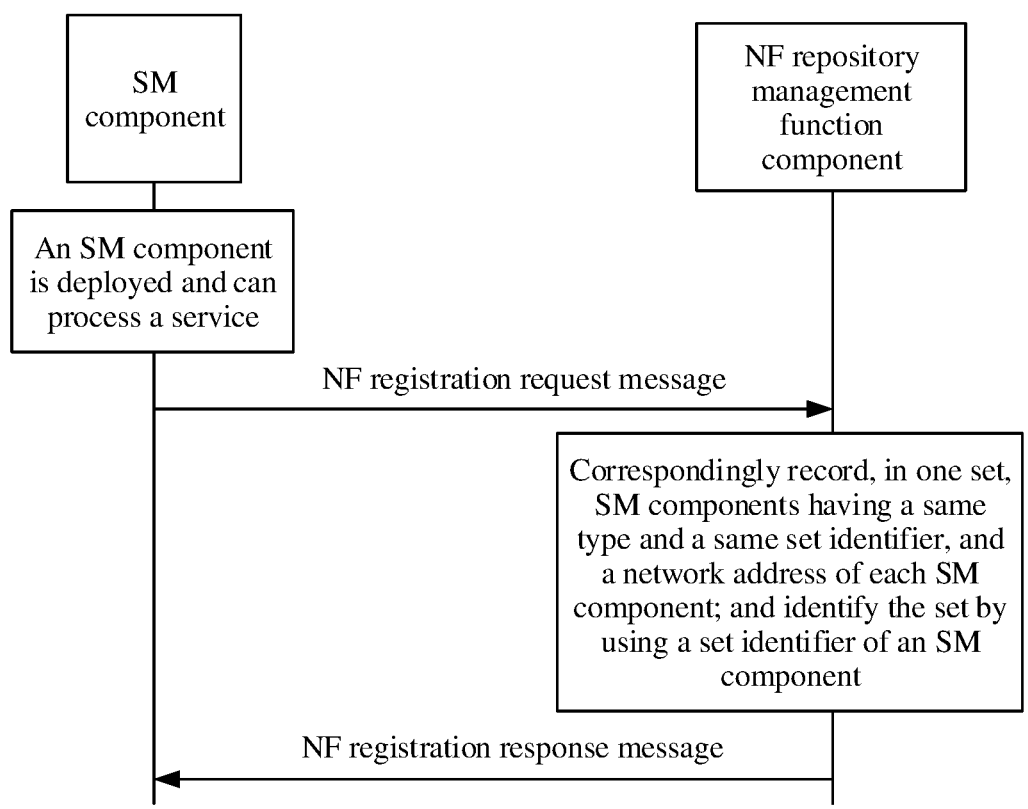
FIG. 3b is another flowchart of storing, by an NF repository management function component, related information of an NF component according to an embodiment of the present disclosure.

Optionally, as shown in FIG. 3b, another implementation of storing an SM component set in the NF repository management function component is as follows. A network management function server determines related information of each SM component, such as an identifier of the SM component, an NF type corresponding to the SM component, and an identifier of a set to which the SM component belongs, and determines an identifier of an NF repository management function component that each SM component needs to access during NF registration. When an SM component is deployed and can properly process a service, the SM component sends an NF registration request message to a corresponding NF repository management function component. The NF registration request message includes related information of the SM component. After receiving the registration request message, the NF repository management function component correspondingly records, in one set, SM components having a same NF type and a same set identifier, and an identifier of each SM component; identifies the set using an identifier of the set to which an SM component belongs; and sends an NF registration response message to the SM component. In this way, the NF repository management function completes storage of information about an SM component set.

An identifier of an SM component is used to uniquely identify a location of the SM component in the network. The identifier of the SM component may be a network address of the SM component or a Fully Qualified Domain Name (FQDN) of the SM component. An NF type corresponding to the SM component is used to identify a network function correspondingly executed by the SM component. An identifier of a set to which the SM component belongs is used to identify the set to which the SM component belongs.

For example, the identifier of the SM component 1 is an Internet Protocol (IP) address 1, an NF type corresponding to the SM component 1 is a type 1, and the identifier of the set to which the SM component 1 belongs is A. An identifier of an SM component 2 is an IP address 2, an NF type corresponding to the SM component 2 is the type 1, and an identifier of a set to which the SM component 2 belongs is A. An identifier of an SM component 3 is an IP address 3, an NF type corresponding to the SM component 3 is a type 2, and an identifier of a set to which the SM component 3 belongs is B. An identifier of an SM component 4 is an IP address 4, an NF type corresponding to the SM component 4 is the type 2, and an identifier of a set to which the SM component 4 belongs is B. In this case, after receiving related information of these SM components, the NF repository management function component may store the information in a form of a table (as shown in the following Table 1):

TABLE 1

| SM component set | SM component | Identifier of the SM component |
|---|---|---|
| Set A | SM component 1 | IP address 1 |
|  | SM component 2 | IP address 2 |
| Set B | SM component 3 | IP address 3 |
|  | SM component 4 | IP address 4 |

It may be understood that, the related information of the SM component includes but is not limited to the identifier of the SM component, the NF type corresponding to the SM component, and the identifier of the set to which the SM component belongs, and may further include related information of another NF component accessible by the SM component, and the like. This is not limited in this embodiment of the present disclosure.

Step 106: The NF repository management function component receives the NF discovery request message, searches at least one stored SM component set, determines that an alternative SM component 2 exists, and sends an NF discovery response message to the SM component 1.

The NF discovery response message may include the identifier of the SM component 2, and the NF discovery response message is used to notify the SM component 1 that the SM component 2 having a same function as the SM component 1 exists in the core network and can share load on the SM component 1.

Optionally, the NF repository management function component may search for, based on the identifier of the SM component 1, an SM component set corresponding to the identifier, namely, the SM component set to which the SM component belongs; if an SM component other than the SM component 1 exists in the found SM component set, select any of the SM component other than the SM component 1 as the SM component 2; and add the identifier of the SM component 2 to the NF discovery response message, and send the NF discovery response message to the SM component 1.

Alternatively, the NF repository management function component may search the at least one SM component set, to find an SM component set identified by the identifier that is in the NF discovery request message and that is of the set to which the SM component 1 belongs; if an SM component other than the SM component 1 exists in the found SM component set, select any of the SM component other than the SM component 1 as the SM component 2; and add the identifier of the SM component 2 to the NF discovery response message, and send the NF discovery response message to the SM component 1.

For example, if the identifier of the set to which the SM component 1 belongs is A, after receiving the NF discovery request message, the NF repository management function component searches the foregoing Table 1; determines that the set whose set identifier is A further includes the SM component 2 and that the identifier of the SM component 2 is the IP address 2; and adds the IP address 2 to the NF discovery response message, and sends the NF discovery response message to the SM component 1.

Step 107: The SM component 1 sends an NF update request message to the MM component.

The NF update request message may include the identifier of the SM component 2, or may include the identifier of the SM component 2 and a load balancing policy.

The load balancing policy may be determined by the SM component 1 based on a load status of the SM component 1. The load balancing policy is used to specify load shared by each SM component during load sharing, for example, the load on the SM component 1 and load on the SM component 2, to implement load balancing.

In some implementations, the load balancing policy may be as follows. A plurality of UEs that correspond to a segment of consecutive IMSIs and that are in the at least one user equipment establishing a PDU session with the SM component 1 are allocated to the SM component 2, such that the SM component 2 is responsible for PDU sessions of these UEs, and the SM component 1 is responsible for a PDU session of remaining user equipment in the at least one user equipment. Alternatively, a plurality of UEs that correspond to a segment of consecutive IMSIs are allocated to the SM component 1, such that the SM component 1 is responsible for PDU sessions of these UEs, and the SM component 2 is responsible for a PDU session of remaining user equipment in the at least one user equipment. The segment of consecutive IMSIs may be some consecutive IMSIs but not all IMSIs in an IMSI corresponding to the at least one user equipment.

For example, if 200 UEs establish PDU sessions with the SM component 1, and IMSIs corresponding to these UEs are from 1 to 200, the SM component 1 may formulate a load balancing policy based on the load status of the SM component 1. For example, the SM component 1 may allocate, to the SM component 2, 40 UEs corresponding to a segment of IMSIs from 60 to 100, such that the SM component 2 completes PDU sessions of the 40 UEs, and PDU sessions of 160 remaining UEs are still completed by the SM component 1.

Alternatively, the load balancing policy may be an IMSI hash rule. For example, an IMSI corresponding to the at least one user equipment establishing a PDU session with the SM component 1 is classified into a set of even IMSIs and a set of odd IMSIs. The set of even IMSIs includes all even IMSIs in the IMSI corresponding to the at least one user equipment, and the set of odd IMSIs includes all odd IMSIs in the IMSI corresponding to the at least one user equipment. The SM component 1 completes PDU sessions of UEs corresponding to the even IMSIs, and the SM component 2 completes PDU sessions of UEs corresponding to the odd IMSIs. Alternatively, the SM component 2 completes PDU sessions of UEs corresponding to the even IMSIs, and the SM component 1 completes PDU sessions of UEs corresponding to the odd IMSIs.

For example, if 200 UEs establish PDU sessions with the SM component 1, and IMSIs corresponding to these UEs are from 1 to 200, UEs corresponding to even IMSIs in the 200 IMSIs may be allocated to the SM component 2, the SM component 2 completes PDU sessions of the 100 UEs, and PDU sessions of 100 remaining UEs are still completed by the SM component 1.

Step 108: The MM component receives the NF update request message, updates the context of the SM component 1 according to a load balancing policy, and creates a context of the SM component 2.

Optionally, after receiving the NF update request message that includes only the identifier of the SM component 2, the MM component may autonomously determine which user equipment performing a PDU session with the SM component 1 is to be allocated to the SM component 2.

Alternatively, after receiving the NF update request message that includes the identifier of the SM component 2 and the load balancing policy, the MM component determines, according to the load balancing policy, which user equipment performing a PDU session with the SM component 1 is to be allocated to the SM component 2; searches the context of the SM component 1 stored in the MM component; deletes an identifier, in the context of the SM component 1, of the user equipment to be allocated to the SM component 2; and records, as the context of the SM component 2, a correspondence among the identifier of the user equipment to be allocated to the SM component 2, a session identifier of the PDU session, and the identifier of the SM component 2.

Step 109: The MM component receives SM signaling sent by the user equipment, searches a context of an SM component stored in the MM component, and forwards the SM signaling to an SM component (such as SM component 2) based on an identifier of the SM component in found context of the SM component.

The SM signaling may include the identifier of the user equipment and the session identifier of the PDU session.

Optionally, after receiving the SM signaling sent by the user equipment, the MM component searches, based on the identifier of the user equipment and the session identifier of the PDU session that are carried in the SM signaling, the context of the SM component stored in the MM component for a context of an SM component including the identifier of the user equipment and the identifier of the PDU session, and sends the SM signaling to the SM component based on an identifier of the SM component in the found context of the SM component. For example, if the identifier of the user equipment and the identifier of the PDU session are included in the context of the SM component 1, the MM component sends the SM signaling to the SM component 1. Alternatively, if the identifier of the user equipment and the identifier of the PDU session are included in the context of the SM component 2, the MM component sends the SM signaling to the SM component 2.

Therefore, after the technical solution shown in FIG. 3-1 and FIG. 3-2 is used, when an SM component serving user equipment is overloaded, another available SM component in a same SM component set as the SM component is obtained, and the new SM component processes some services of the original SM component and provides a service for the user equipment. Therefore, service interruption is avoided, and load on the original SM component is reduced. In addition, participation of the user equipment is not required in the load sharing process, namely, the process is unknown to the user equipment, such that network service reliability is improved.

Figure 4:
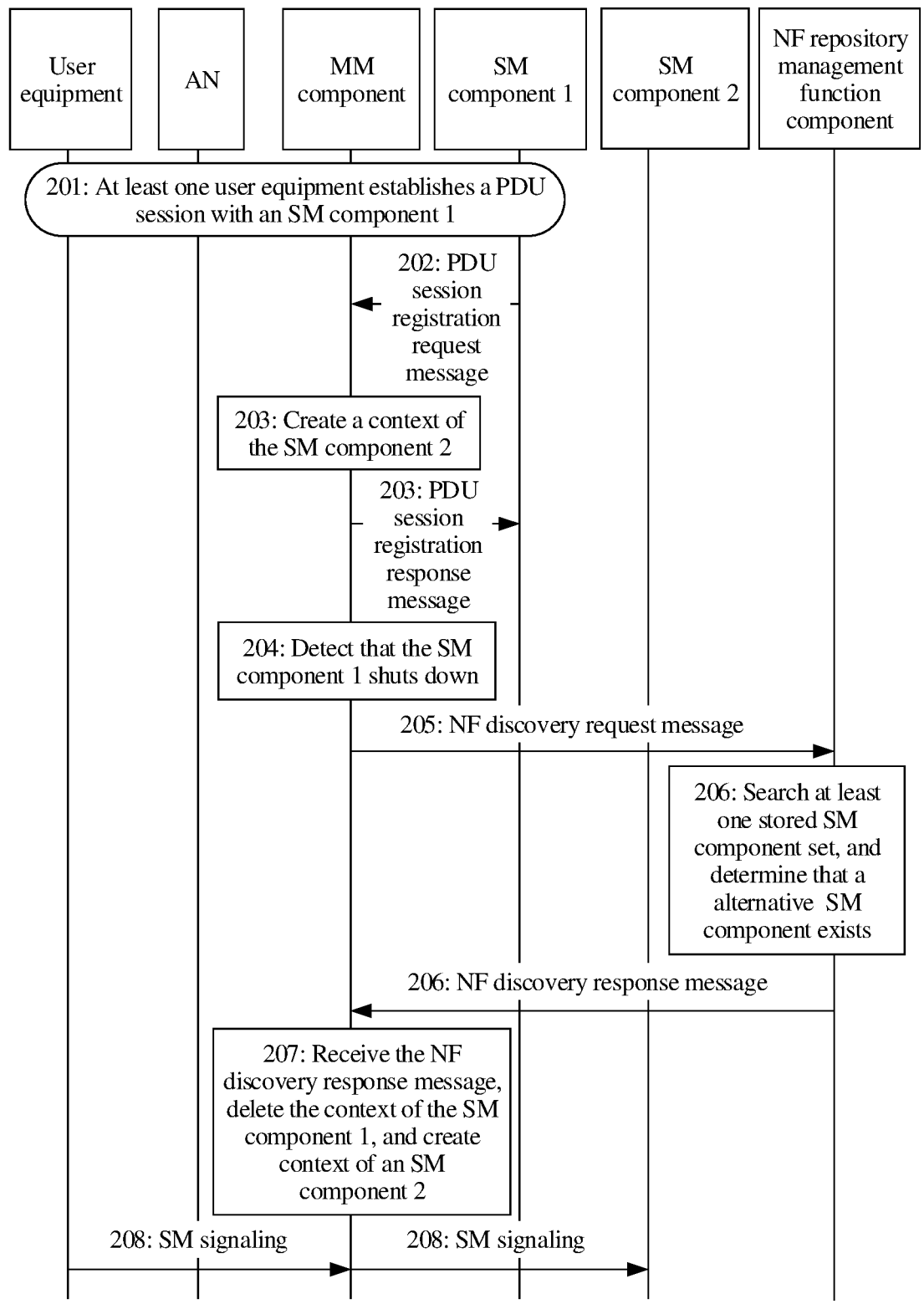
FIG. 4 is a flowchart of another method for processing an NF component exception according to an embodiment of the present disclosure.

In another implementation solution of the embodiments of the present disclosure, the following problem may be further resolved: An SM component shuts down (cannot operate) in a process in which user equipment performs a session with the SM component. As shown in FIG. 4, FIG. 4 is a flowchart of another method for processing an NF component exception. The method is executed through interaction between devices in the network shown in FIG. 2, and the method may include the following steps.

For steps 201 to 203, step 201 is the same as step 101 shown in FIG. 3-1 and FIG. 3-2, step 202 is the same as step 102 shown in FIG. 3-1 and FIG. 3-2, and step 203 is the same as step 103 shown in FIG. 3-1 and FIG. 3-2. Details are not described herein again.

Step 204: The MM component detects that the SM component 1 shuts down.

Optionally, the MM component may detect, using conventional approaches, that the SM component 1 shuts down, so detailed description is not repeated in this embodiment of the present disclosure.

Step 205: The MM component sends an NF discovery request message to an NF repository management function component.

The NF discovery request message is used to request the NF repository management function component to query whether an alternative SM component exists in a network in which the SM component 1 is located. The NF discovery request message may include an identifier of the SM component 1, or may include an identifier of a set to which the SM component 1 belongs. The alternative SM component may be an SM component that has a same function as the SM component 1 and that is in a same SM component set as the SM component 1.

The NF repository management function component pre-stores at least one SM component set. Each SM component set includes at least one SM component, one SM component corresponds to one identifier, and SM components in a same SM component set have a same network function. The NF repository management function component may store the at least one SM component set in a form of a table, or may store the at least one SM component set in another form. This is not limited in this embodiment of the present disclosure.

A process in which the NF repository management function component pre-stores at least one SM component set is shown in FIG. 3a, and details are not described herein again.

Step 206: The NF repository management function component receives the NF discovery request message, searches at least one stored SM component set, determines that an alternative SM component 2 exists, and sends an NF discovery response message to the MM component.

The NF discovery response message may include an identifier of the SM component 2, and the NF discovery response message is used to notify the MM component that the SM component 2 having a same function as the SM component 1 exists in the network in which the SM component 1 is located and can share load on the SM component 1.

The process of determining that an alternative SM component 2 exists in step 206 is the same as that in step 106, and details are not described herein again.

Step 207: The MM component receives the NF discovery response message, deletes the context of the SM component 1 based on the NF discovery response message, and creates a context of the SM component 2.

Optionally, after receiving the NF discovery response message, the MM component determines, based on the identifier of the SM component 2 in the response message, to allocate all services of the SM component 1 to the SM component 2 for processing; searches the context of the SM component 1 stored in the MM component; deletes the context of the SM component 1; and records, as the context of the SM2 component, a correspondence among an identifier of the user equipment, a session identifier of the PDU session, and the identifier of the SM component 2, where the identifier of the user equipment and the session identifier of the PDU session are in the SM component 1.

Step 208: The MM component receives SM signaling sent by the user equipment, searches a context of an SM component stored in the MM component, and forwards the SM signaling to the SM component 2 based on an identifier of the SM component in a found context of the SM component.

The SM signaling may include the identifier of the user equipment and the session identifier of the PDU session.

Optionally, after receiving the SM signaling sent by the user equipment, the MM component searches, based on the identifier of the user equipment and the session identifier of the PDU session that are carried in the SM signaling, the context of the SM component stored in the MM component for a context of an SM component including the identifier of the user equipment and the identifier of the PDU session. Further, the MM component sends the SM signaling to the SM component based on an identifier of the SM component in the found context of the SM component.

Therefore, after the technical solution shown in FIG. 4 is used, when an SM component serving user equipment shuts down (cannot operate at all), another available SM component in a same SM component set as the SM component is obtained. Then the new SM component processes all services of the original SM component and provides a service for the user equipment. Therefore, service interruption is avoided. In addition, participation of the user equipment is not required in the process, that is, the process is unknown to the user equipment, such that network service reliability is improved.

Figure 5:
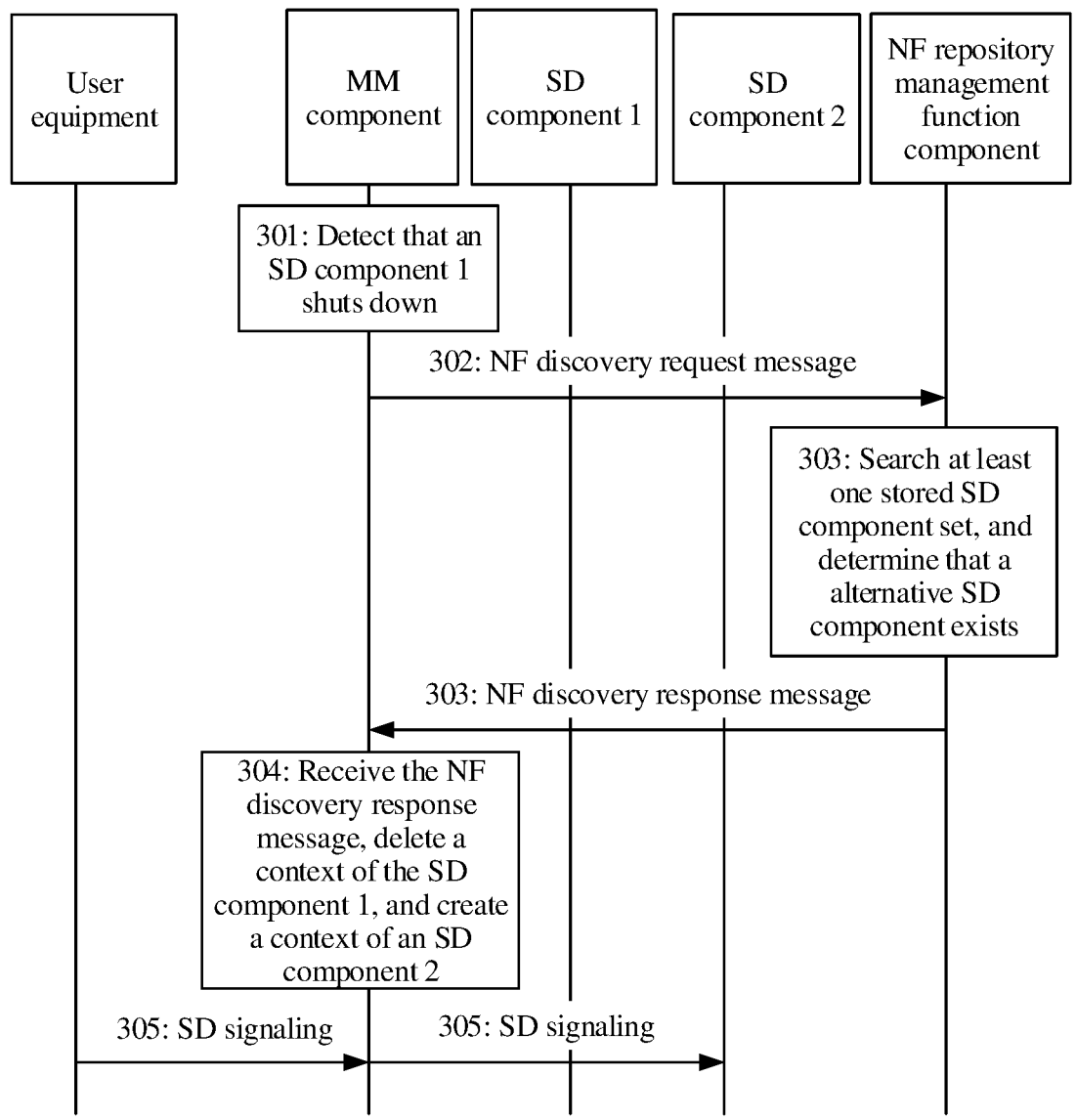
FIG. 5 is a flowchart of another method for processing an NF component exception according to an embodiment of the present disclosure.

In another implementation solution of the embodiments of the present disclosure, the following problem may be further resolved. An SD component shuts down (cannot operate) in a process in which user equipment performs small data transmission with the SD component. As shown in FIG. 5, FIG. 5 is a flowchart of another method for processing an NF component exception. The method is executed through interaction between devices in the network shown in FIG. 2, and the method may include the following steps.

Step 301: An MM component detects that an SD component 1 shuts down.

Optionally, the MM component may detect, using conventional approaches, that the SD component 1 shuts down, so detailed description is not repeated in this embodiment of the present disclosure.

Step 302: The MM component sends an NF discovery request message to an NF repository management function component.

The NF discovery request message is used to request the NF repository management function component to query whether an alternative SD component exists in a network in which the SD component 1 is located. The NF discovery request message may include an identifier of a set to which the SD component 1 belongs, or may include an identifier of the SD component 1. The alternative SD component may be an SD component that has a same function as the SD component 1 and that is in a same SD component set as the SD component 1.

The NF repository management function component pre-stores at least one SD component set. Each SD component set includes at least one SD component, one SD component corresponds to one identifier, and SD components in a same SD component set have a same network function. The NF repository management function component may store the at least one SD component set in a form of a table, or may store the at least one SD component set in another form. This is not limited in this embodiment of the present disclosure.

A process in which the NF repository management function component pre-stores at least one SD component set is shown in FIG. 3a, and details are not described herein again.

Step 303: The NF repository management function component receives the NF discovery request message, searches at least one stored SD component set, determines that an alternative SD component 2 exists, and sends an NF discovery response message to the MM component.

The NF discovery response message may include an identifier of the SD component 2, and the NF discovery response message is used to notify the MM component that the SD component 2 having a same function as the SD1 component exists in the core network and can share load on the SD component 1.

The process of determining that an alternative SD component 2 exists in step 303 is the same as that in step 106, and details are not described herein again.

Step 304: The MM component receives the NF discovery response message, deletes a context of the SD component 1 based on the NF discovery response message, and creates a context of the SD component 2.

Optionally, after receiving the NF discovery response message, the MM component determines, based on the identifier of the SD component 2 in the response message, to allocate all services of the SD component 1 to the SD component 2 for processing; searches the context of the SD component 1 stored in the MM component; deletes the context of the SD component 1; and records, as the context of the SD2 component, a correspondence among an identifier of user equipment, a session identifier of a PDU session, and the identifier of the SD component 2, where the identifier of the user equipment and the session identifier of the PDU session are in the SD component 1.

Step 305: The MM component receives SD signaling sent by user equipment, searches a context of an SD component stored in the MM component, and forwards the SD signaling to the SD component 2 based on an identifier of an SD component in a found context of the SD.

The SD signaling may include the identifier of the user equipment and the session identifier of the PDU session.

Optionally, after receiving the SD signaling sent by the user equipment, the MM component searches, based on the identifier of the user equipment and the session identifier of the PDU session that are carried in the SD signaling, the context of the SD component stored in the MM component for a context of an SD component including the identifier of the user equipment and the identifier of the PDU session. Further, the MM component sends the SD signaling to the SD component based on an identifier of the SD component in the found context of the SD component.

Therefore, after the technical solution shown in FIG. 5 is used, when an SD component serving user equipment shuts down (cannot operate at all), another available SD component in a same SD component set as the SD component is obtained. Then the new SD component processes all services of the original SD component and provides a service for the user equipment. Therefore, service interruption is avoided. In addition, participation of the user equipment is not required in the process, that is, the process is unknown to the user equipment, such that network service reliability is improved.

The foregoing mainly describes, from the perspective of interaction between the NF repository management function component, the first NF component, and the second NF component, the method for processing an NF component exception provided in the embodiments of the present disclosure. It may be understood that, to achieve the foregoing functions, the foregoing node or network element includes a corresponding hardware structure and/or software module for implementing each function. Persons skilled in the art may be easily aware that, units and algorithm steps in each example described with reference to the embodiments disclosed in this specification can be implemented in a form of hardware or a combination of hardware and computer software in the present disclosure. Whether a function is implemented by hardware or computer software driving hardware depends on particular applications and design constraint conditions of the technical solutions. Persons skilled in the art may use different methods to implement the described functions for each particular application, but it should not be considered that the implementation goes beyond the scope of the present disclosure.

Figure 10:
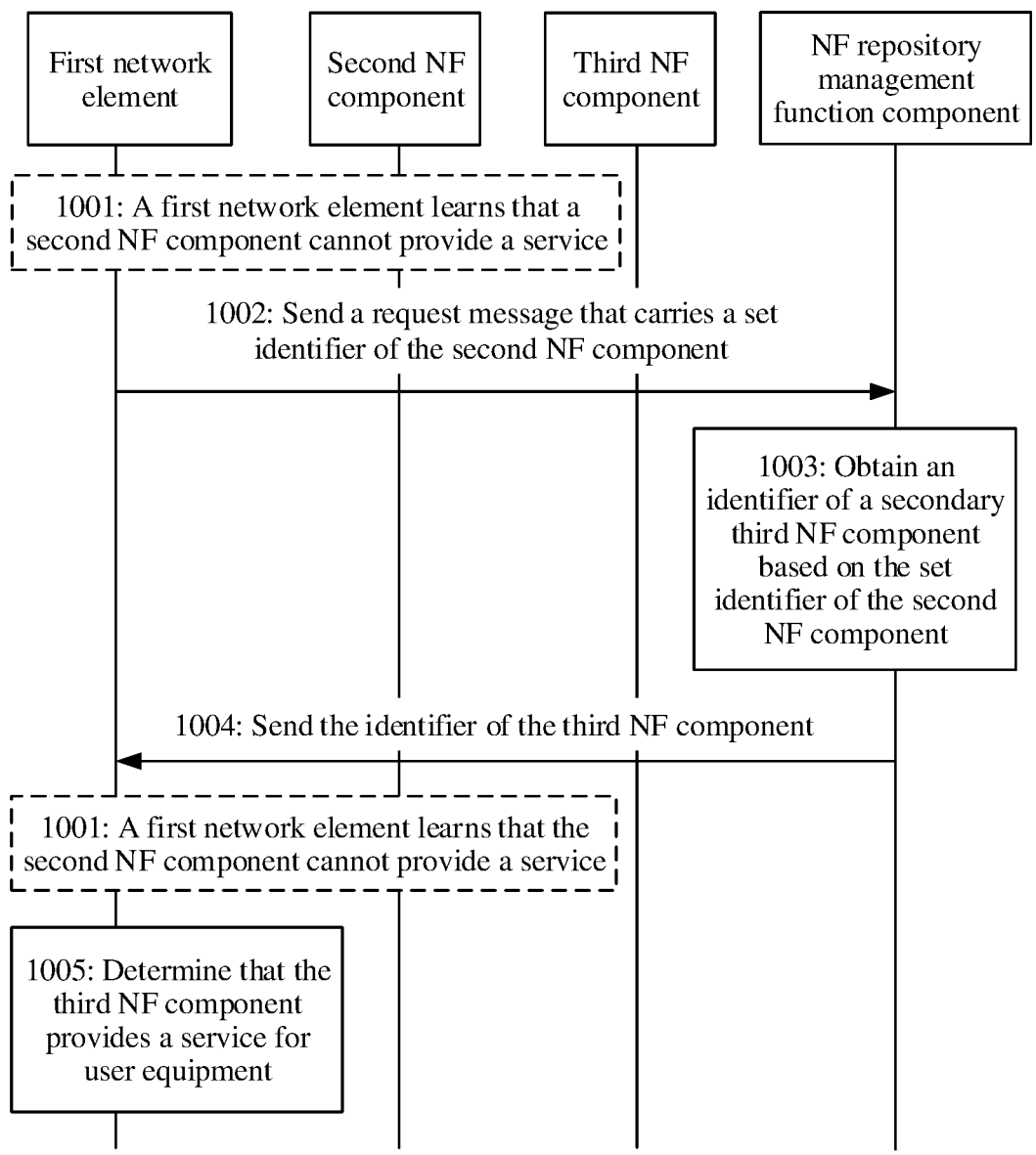
FIG. 10 is a flowchart of another method for processing an NF component exception according to an embodiment of the present disclosure.

Based on the methods in the first embodiment to the third embodiment, an embodiment of the present disclosure may be further used to process an exception occurring in an MM component. An access network transfers a message exchanged between user equipment and the MM component, to complete service interaction between the user equipment and an NF component in a core network. If an exception occurs in the MM component in a message exchange process, a solution provided in this embodiment of the present disclosure may be used to ensure that the access network exchanges a message with an alternative MM component. This way, a network side can continue to provide a service for the user equipment, and network quality of service of the network is improved. As shown in FIG. 10, this application provides an NF management method, including the following steps.

1001. A first network element learns that a second NF component cannot provide a service.

The first network element learns, using conventional approaches, that the second NF component cannot provide a service. For example, the first network element finds, using a detection technology, that the second NF component shuts down; or when sending, to the second NF component, information from a terminal, the first network element does not receive response and the like within a specified time; or the second NF component sends a notification message to notify the first network element that the second NF component cannot provide a service. The first network element may be a first NF component, the second NF component, or an access network AN. For example, if the first network element is an access network (AN), the second NF component may be an MM component; or if the first network element is a first NF component and is an MM component, the second NF component may be an SM component, an SD component, or another NF component described above; or if the first network element is a first NF component and is an SM component or an SD component, the second NF component may be an MM component. If the first network element is the second NF component, the second NF component may be an MM component.

1002. The first network element obtains a set identifier of the second NF component, and sends the set identifier of the second NF component to an NF repository management function component, to request to query an alternative NF component.

Optionally, the first network element may send an identifier of the second NF component.

In some implementations, the set identifier of the second NF component may be carried in a request message, for example, an NF discovery request message. Alternatively, the request message may further include the identifier of the second NF component.

An implementation in which the first network element obtains the set identifier of the second NF component may include the following manners.

Manner 1: The first network element receives a message sent by user equipment, where the message carries the set identifier of the second NF component, and the first network element obtains the carried set identifier from the message sent by the user equipment.

Manner 2: The first network element locally obtains the set identifier of the second NF component. For example, the first network element receives a message sent by user equipment, where the message carries the component identifier of the second NF component, and locally obtains the set identifier of the second NF component based on the component identifier of the second NF component. Alternatively, the first network element finds that the second NF component is faulty, and locally obtains the set identifier of the second NF component.

1003. The NF repository management function component obtains an identifier of an alternative third NF component based on the set identifier of the second NF component, where the third NF component and the second NF component belong to a same set.

There may be one or more identifiers of third NF components. The identifier of the third NF component is different from the identifier of the second NF component, that is, the third NF component and the second NF component are not a same component.

An implementation of step 1003 may be as follows. The NF repository management function component learns of, based on the set identifier of the second NF component, an NF component set to which the second NF component belongs, and selects, as the alternative third NF component, one or more NF components from the NF component set to which the second NF component belongs.

Optionally, this embodiment may further include the following step.

The NF repository management function component receives a registration request message from a network management function server (for details, refer to FIG. 3a, where an SM component is used as an example for description in FIG. 3a) or an NF component (for details, refer to FIG. 3b, where an SM component is used as an example for description in FIG. 3b), where the registration request message includes at least an identifier of an NF component and a set identifier of the NF component. The NF component includes the second NF component and/or the third NF component, and the second NF component has a same set identifier as the third NF component. In this way, because the network management function server or the NF component sends the set identifier to the NF repository management function component, the NF repository management function component generates an NF component set based on a same set identifier (for a detailed generation process, refer to descriptions in FIG. 3a or FIG. 3b).

1004. The NF repository management function component sends the identifier of the third NF component to the first network element, where there may be one or more identifiers of third NF components.

1005. The first network element determines that the third NF component provides a service for user equipment.

If there are a plurality of third NF components, the first network element may select one of the third NF components to provide a service, or may select a plurality of third NF components as required, to provide a service.

Optionally, in this embodiment, when the first network element is the second NF component, that is, after finding that itself cannot provide a service, the second NF component obtains the identifier of the alternative third NF component. In this case, step 1005 may include: sending, by the second NF component, the identifier of the third NF component to an access network, that is, the second NF component notifies the access network that the third NF component takes over a service of the second NF component.

Optionally, in this embodiment, when the first network element is a first NF component or an access network, step 1005 may include the following manners.

Manner 1: The first NF component or the access network updates a correspondence between the user equipment and the second NF component to a correspondence between the user equipment and the third NF component. When subsequently receiving information to be sent by the user equipment or another network device to the second NF component, the first NF component or the access network may send the information to the third NF component based on the updated correspondence. When the first NF component is an SM component and the second NF component is an MM component, the correspondence further includes an identifier of a PDU session.

Manner 2: If the user equipment requests to access the second NF component, step 1005 includes: sending, by the first NF component or the access network to the third NF component, information to be sent by the user equipment to the second NF component. It may be understood that, the information to be sent by the user equipment may be transmitted via different messages in a transmission process. For example, the access network receives a request message from the user equipment, where the message carries the information, and the first network element directly sends the message to the third NF component, or the first network element extracts the information, performs re-encapsulation to generate a new message, and then sends the message to the third NF component.

Optionally, in this embodiment, when the first network element is an access network, step 1002 of sending, by the first network element, the set identifier of the second NF component to an NF repository management function component includes: sending, by the access network, the set identifier of the second NF component to the NF repository management function component via an NF discovery management function, and step 1004 of sending, by the NF repository management function component, the identifier of the third NF component to the first network element includes: sending, by the NF repository management function component, the identifier of the third NF component to the access network via the NF discovery management function. It may be understood that, the set identifier of the second NF component and the identifier of the third NF component may be transmitted using messages in different forms in a transmission process. For example, the access network sends the set identifier of the second NF component to the NF repository management function component via the NF discovery management function, and after receiving the set identifier of the second NF component sent by the access network, the NF discovery management function may generate a new message through re-encapsulation, and send the message to the NF repository management function component.

It may be understood that, there is no sequence between step 1001 and steps 1002 to 1004. In other words, the first network element may learn that the second NF component cannot provide a service, and then obtain the identifier of the alternative third NF component from the NF repository management function component and determine that the third NF component provides a service for the user equipment. Alternatively, the first network element may obtain the identifier of the alternative third NF component from the NF repository management function component, and when learning that the second NF component cannot provide a service, the first network element determines, based on the obtained identifier of the third NF component, that the third NF component provides a service for the user equipment.

Figure 11:
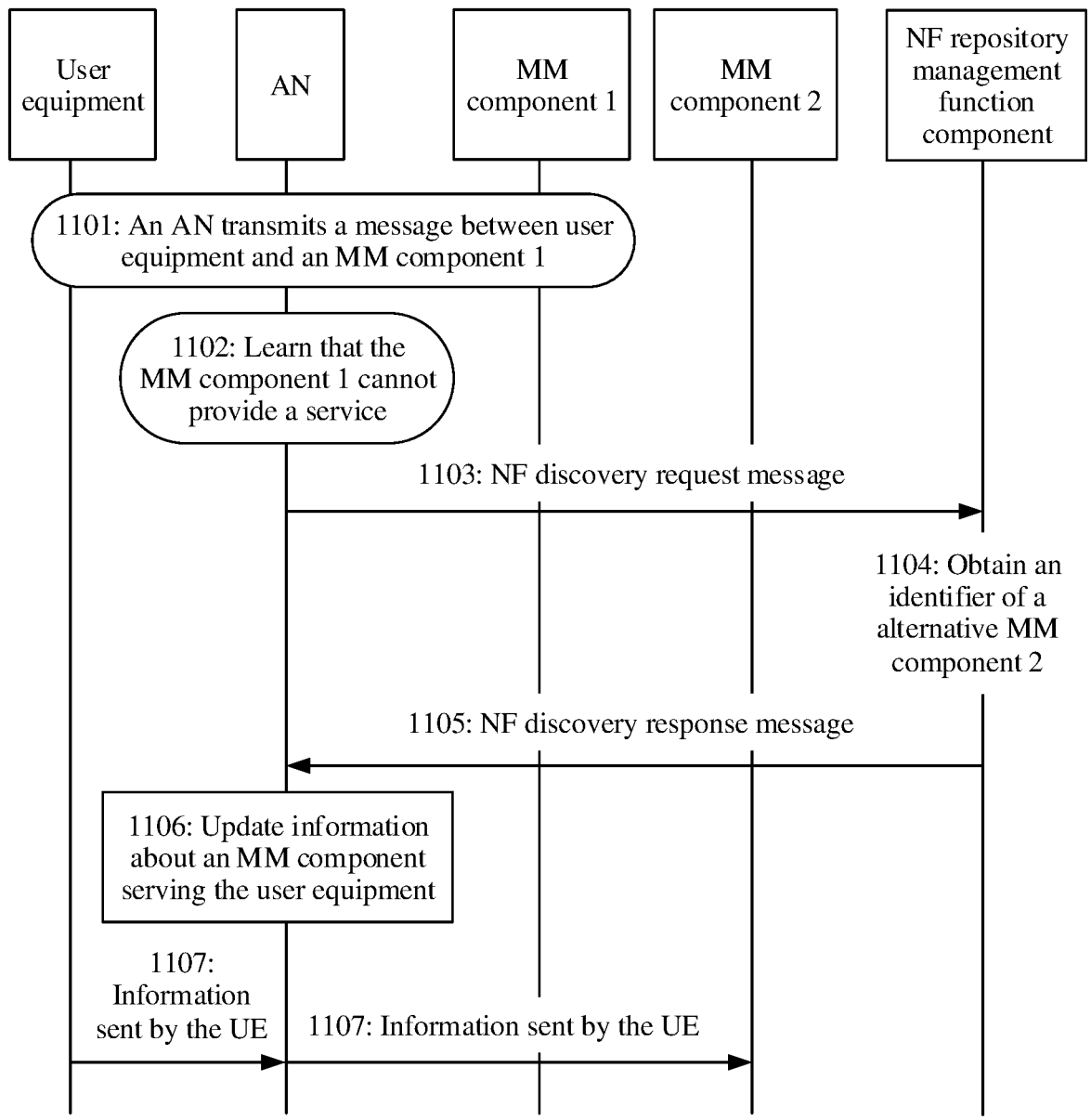
FIG. 11 is a flowchart of another method for processing an NF component exception according to an embodiment of the present disclosure.

Based on the embodiment in FIG. 10, in an example, as shown in FIG. 11, FIG. 11 is a flowchart of another method for processing an NF component exception. The method is executed through interaction between devices in the network shown in FIG. 2. In this embodiment, an access network is used as an example of a first network element, an MM component 1 is used as an example of a second NF component, and an MM component 2 is used as an example of a third NF component. The method may include the following steps.

Step 1101: The access network (AN) transmits a message between user equipment and the MM component 1.

The message between the user equipment and the MM component 1 includes data (such as SMS data) or control-plane signaling (for example, the signaling may be signaling of an access and mobility management type, signaling of a session management type, or the like). The AN stores an obtained identifier of the MM component 1 and an obtained identifier of an MM set to which the MM component 1 belongs.

Step 1102: The access network learns that the MM component 1 cannot provide a service.

For example, the AN may detect, using conventional approaches, that the MM component 1 shuts down. For details, refer to descriptions in the embodiment in FIG. 10, so detailed description is not repeated in this embodiment of the present disclosure.

Step 1103: The AN sends an NF discovery request message to an NF repository management function component.

The NF discovery request message is used to request the NF repository management function component to query whether an alternative MM component exists in a network corresponding to the MM component 1. The NF discovery request message may include the identifier of the set to which the MM component 1 belongs, or may further include the identifier of the MM component 1. The alternative MM component may be an MM component that has a same function as the MM component 1 and that is in a same MM component set as the MM component 1.

Step 1104: The NF repository management function component receives the NF discovery request message, searches at least one stored MM component set, and obtains an identifier of the alternative MM component 2.

The identifier of the MM component 2 is different from the identifier of the MM component 1.

For an obtaining process, refer to descriptions in step 1003. For example, the NF repository management function component pre-stores at least one MM component set. An MM component set includes at least one MM component, one MM component corresponds to one component identifier, and MM components in a same MM component set have a same network function NF. The NF repository management function component may store the at least one MM component set in a form of a table, or may store the at least one MM component set in another form. This is not limited in this embodiment of the present disclosure.

Step 1105: Send an NF discovery response message to the access network.

The NF discovery response message may include the identifier of the MM component 2, and the NF discovery response message is used to notify the access network that the MM component 2 having a same function as the MM component 1 exists in a core network and can share load on the MM component 1.

Step 1106: The access network receives the NF discovery response message, and updates, based on the NF discovery response message, context information used to transmit a message between the user equipment and an MM component in a core network.

For example, after receiving the NF discovery response message, the access network determines, based on the identifier of the MM component 2 in the response message, to allocate a service of the MM component 1 to the MM component 2 for processing, and changes a stored correspondence between the user equipment and the identifier of the MM component 1 to a correspondence between the user equipment and the identifier of the MM component 2.

Step 1107: The access network receives information (for example, the information is carried in control-plane signaling) sent by the user equipment, searches context information that is used to transmit a message between the user equipment and the MM component 2 in the core network and that is stored in the access network, and sends, to the MM component 2 based on the found identifier of the MM component 2, the information sent by the user equipment.

The control-plane signaling may include an identifier of the user equipment and an identifier of a type of the control-plane signaling.

Figure 12:
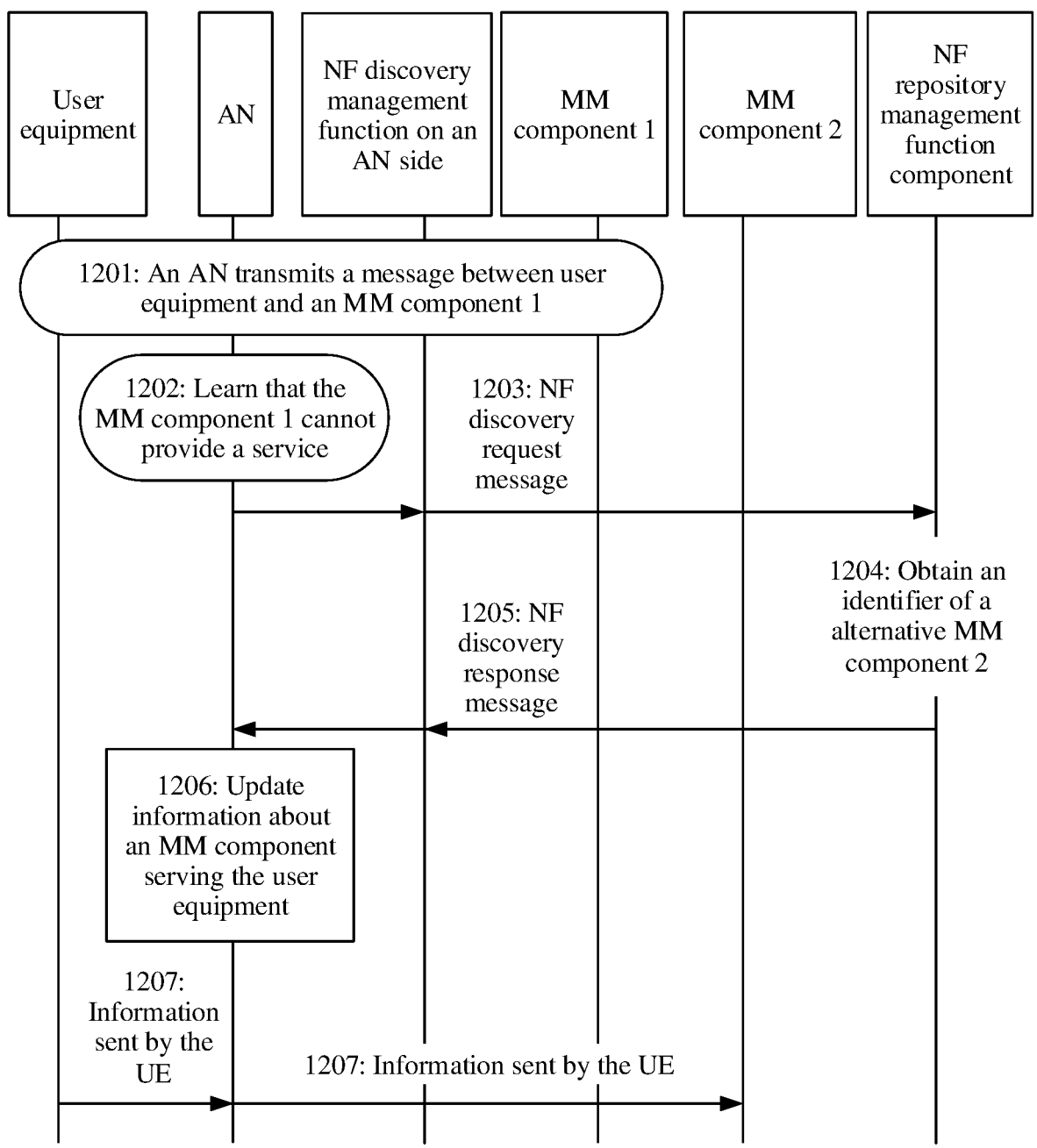
FIG. 12 is a flowchart of another method for processing an NF component exception according to an embodiment of the present disclosure.

Based on the embodiment in FIG. 10, in an example, as shown in FIG. 12, FIG. 12 is a flowchart of another method for processing an NF component exception. The method is executed through interaction between devices in the network shown in FIG. 2. In this embodiment, an access network is used as an example of a first network element, an MM component 1 is used as an example of a second NF component, and an MM component 2 is used as an example of a third NF component. The method may include the following steps.

For steps 1201 and 1202, refer to descriptions in steps 1101 and 1102, respectively.

Step 1203: The AN sends an NF discovery request message to an NF repository management function component via an NF discovery management function on an access network side.

The NF discovery management function on the access network side is deployed in the access network, and the NF discovery management function receives an NF discovery request message from the AN, checks whether the AN allows discovering an MM component in a core network, and further sends the NF discovery request message to the NF repository management function component.

For steps 1204 and 1205, refer to descriptions in steps 1104 and 1105.

Step 1206: The access network receives the NF discovery response message via the NF discovery management function on the access network side, and updates, based on the NF discovery response message, context information used to transmit a message between the user equipment and an MM component in a core network.

Optionally, after receiving the NF discovery response message, the NF discovery management function on the access network side further sends the NF discovery response message to the AN. The AN determines, based on the identifier of the MM component 2 in the response message, to allocate all services of the MM component 1 to the MM component 2 for processing, and changes a stored correspondence between the user equipment and an identifier of the MM component 1 to a correspondence between the user equipment and the identifier of the MM component 2.

For step 1207, refer to descriptions in step 1107.

Figure 13:
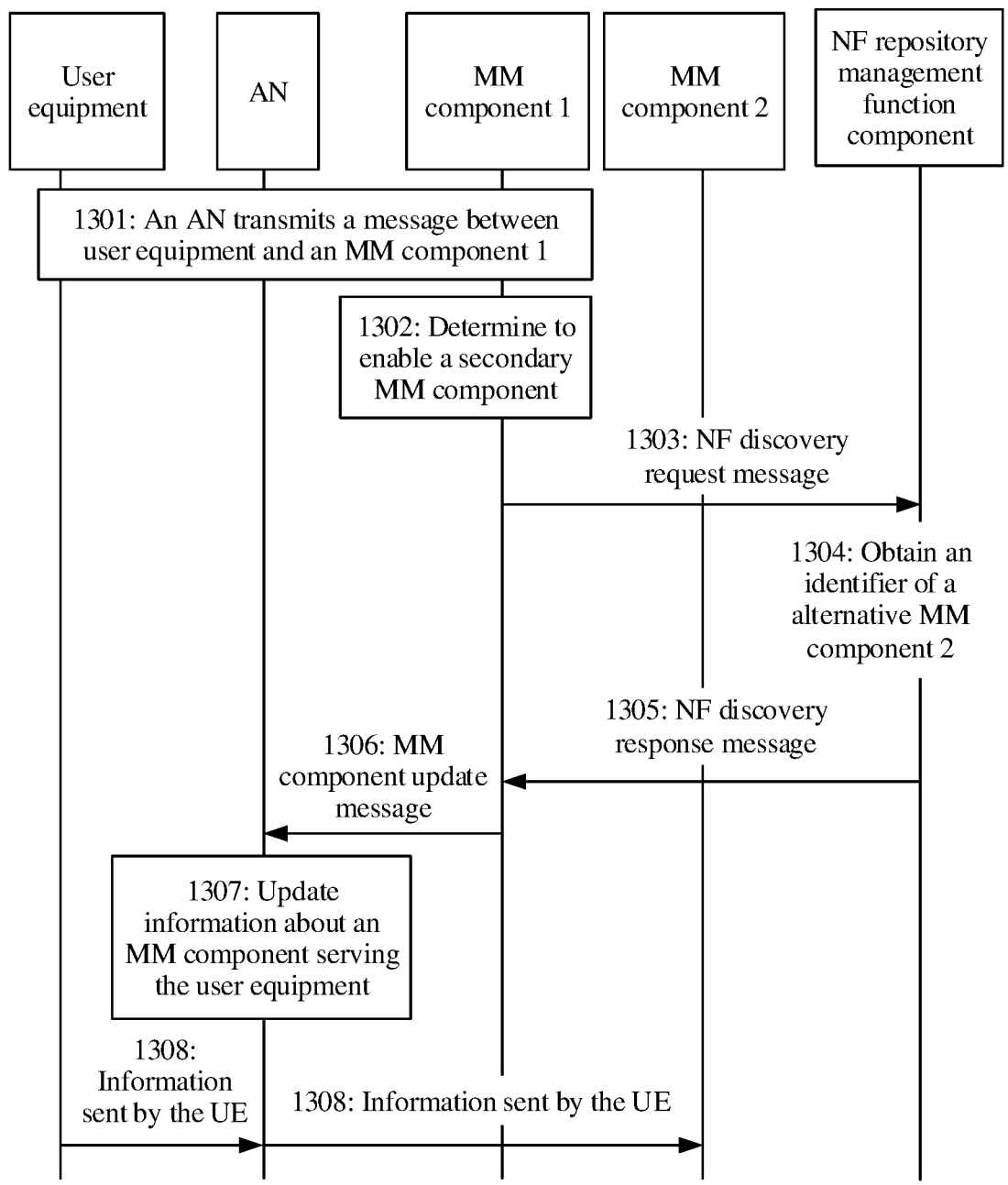
FIG. 13 is a flowchart of another method for processing an NF component exception according to an embodiment of the present disclosure.

Based on the embodiment in FIG. 10, in an example, as shown in FIG. 13, FIG. 13 is a flowchart of another method for processing an NF component exception. The method is executed through interaction between devices in the network shown in FIG. 2. In this embodiment, a first network element is also a second NF component, an MM component 1 is used as an example of the second NF component, and an MM component 2 is used as an example of a third NF component. The method may include the following steps.

Step 1301: An access network AN transmits a message between user equipment and the MM component 1.

For details of the step, refer to step 1101. Details are not described herein again.

Step 1302: The MM component 1 determines that itself cannot continue to provide a service.

The MM component 1 may detect, using conventional approaches, that an exception occurs in the MM component 1, and consequently the MM component 1 cannot continue to process a message and the like from the user equipment and needs to enable an alternative MM component, so detailed description is not repeated in this embodiment of the present disclosure.

Step 1303: The MM component 1 sends an NF discovery request message to an NF repository management function component.

For details of the step, refer to step 1103. The NF discovery request message is used to request the NF repository management function component to query whether an alternative MM component exists in a network in which the MM component 1 is located. The NF discovery request message may include an identifier of a set to which the MM component 1 belongs, or may include an identifier of the MM component 1. The alternative MM component may be an MM component that has a same function as the MM component 1 and that is in a same MM component set as the MM component 1.

Step 1304: The NF repository management function component obtains an identifier of the alternative MM component 2.

For details of the step, refer to step 1104. Details are not described herein again.

Step 1305: The NF repository management function component receives the NF discovery request message, searches at least one stored MM component set, determines that the alternative MM component 2 exists, and sends an NF discovery response message to the MM component 1.

The NF discovery response message may include the identifier of the MM component 2, and the NF discovery response message is used to notify the MM component 1 that the MM component 2 having a same function as the MM component 1 exists in the core network and can share load on the MM component 1.

Step 1306: The MM component 1 receives the NF discovery response message, and sends an MM component update message to the access network based on the NF discovery response message.

The MM component update message includes the identifier of the MM component 2.

Optionally, the MM component 1 stores an identifier of an access network establishing a connection to the MM component 1, and sends the MM component update message to the access network corresponding to the identifier of the access network.

Step 1307: The access network receives the MM component update message, and updates, based on the MM component update message, context information used to transmit a message between the user equipment and an MM component in a core network.

Optionally, after receiving the MM component update message, the AN determines, based on the identifier of the MM component 2 in the message, to allocate all services of the MM component 1 to the MM component 2 for processing, and changes a stored correspondence between the user equipment and the identifier of the MM component 1 to a correspondence between the user equipment and the identifier of the MM component 2.

Step 1308 may be the same as step 1107. Details are not described herein again.

Figure 14:
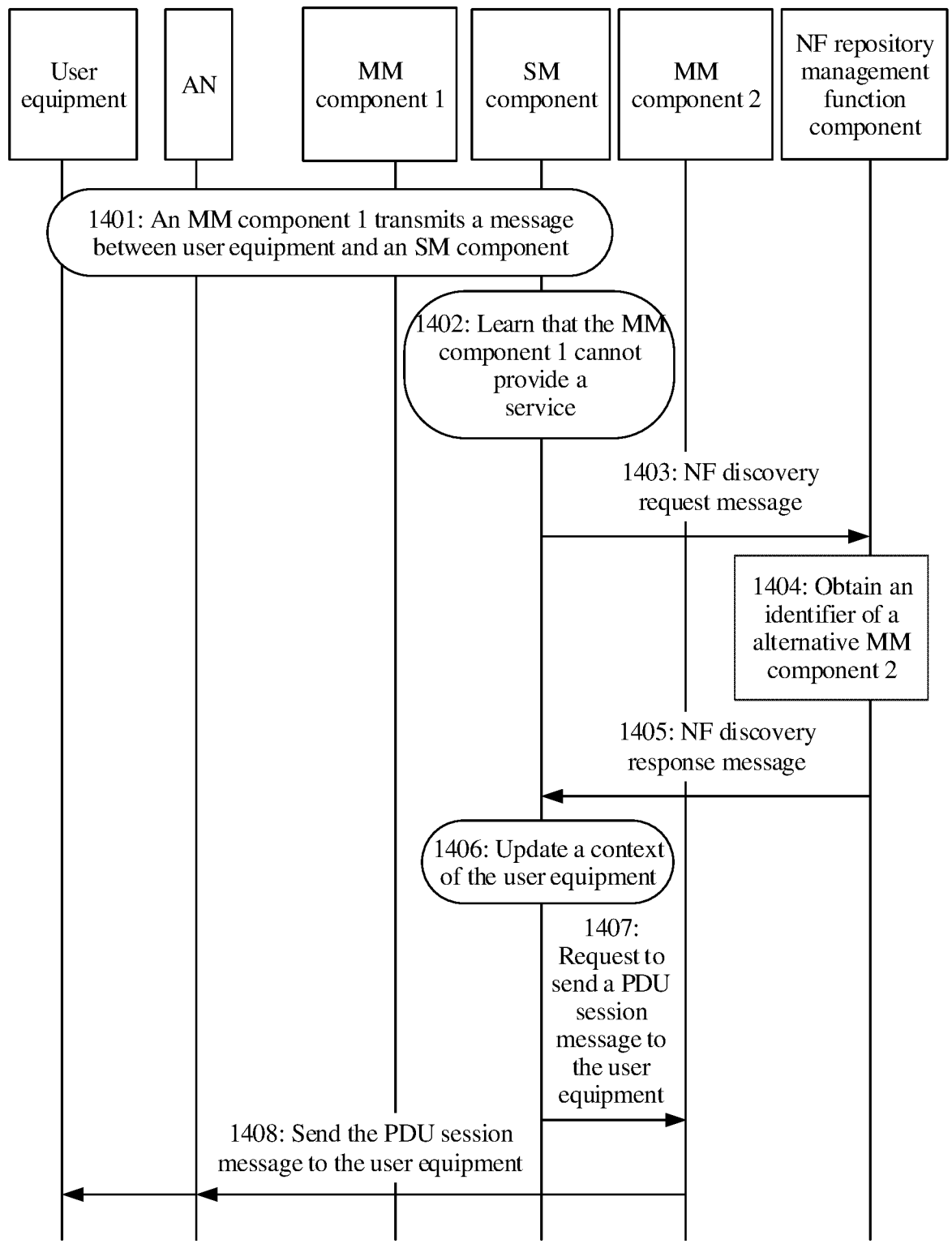
FIG. 14 is a flowchart of another method for processing an NF component exception according to an embodiment of the present disclosure.

Based on the methods in the foregoing embodiments, an embodiment of the present disclosure may be further used to process an exception occurring in an MM component. An MM component 1 transfers a message exchanged between user equipment and another core network component (such as an SM component or an SD component), to complete service interaction between the user equipment and an NF component in a core network. If an exception occurs in the MM component 1 in a message exchange process, the other core network component (such as an SM component or an SD component) may request an alternative MM component 2 from an NF repository management function component via a set identifier of the MM component 1, such that a network side can continue to provide a service for the user equipment, and network quality of service and reliability of the network are improved. As shown in FIG. 14, FIG. 14 is a flowchart of another method for processing an NF component exception. The method is executed through interaction between devices in the network shown in FIG. 2. In this embodiment, an SM component is used as an example of a first network element, an MM component 1 is used as an example of a second NF component, and an MM component 2 is used as an example of a third NF component. The method may include the following steps.

Step 1401: An access network AN transmits a message between user equipment and the MM component 1.

Step 1402: The SM component detects that the MM component 1 shuts down.

Optionally, the SM component may detect, using conventional approaches, that the MM component 1 shuts down. For details, refer to related descriptions in the embodiment in FIG. 10, so detailed description is not repeated in this embodiment of the present disclosure.

Step 1403: The SM component sends an NF discovery request message to an NF repository management function component.

The NF discovery request message is used to request the NF repository management function component to query whether an alternative MM component exists in a network in which the MM component 1 is located. The NF discovery request message may include an identifier of a set to which the MM component 1 belongs, or may further include an identifier of the MM component 1. The alternative MM component may be an MM component that has a same function as the MM component 1 and that is in a same MM component set as the MM component 1. In addition, to improve network running reliability, the alternative MM component and the MM component 1 that are in a same MM component set share a same context database, and the MM component 1 stores context data of the user equipment in the context database. Therefore, when the MM component 1 is faulty, the alternative MM component may obtain the context data of the user equipment from the context database based on an identifier of the user equipment, and further provide a service for the user equipment based on the context data of the user equipment.

The NF repository management function component pre-stores at least one MM component set. Each MM component set includes at least one MM component, one MM component corresponds to one identifier, and MM components in a same MM component set have a same network function. The NF repository management function component may store the at least one MM component set in a form of a table, or may store the at least one MM component set in another form. This is not limited in this embodiment of the present disclosure.

For a process in which the NF repository management function component pre-stores at least one MM component set, refer to the foregoing embodiments, for example, the embodiment in FIG. FIG. 3-1 and FIG. 3-2, and descriptions in FIG. 3a or FIG. 3b. Details are not described herein again.

Step 1404: The NF repository management function component receives the NF discovery request message, searches at least one stored MM component set, determines that the alternative MM component 2 exists, and sends an NF discovery response message to the SM component.

The NF discovery response message may include an identifier of the MM component 2, and the NF discovery response message is used to notify the SM component that the MM component 2 having a same function as the MM component 1 exists in the core network and can share load on the MM component 1.

The process of determining that the alternative MM component 2 exists in step 1404 is the same as that in step 106, and details are not described herein again.

Step 1405: The SM component receives the NF discovery response message, searches, based on an identifier of the MM component 2 in the NF discovery response message, a context of the user equipment stored in the SM component, updates, to the identifier of the MM component 2, an identifier of the MM component 1 in information about a correspondence among an identifier of the user equipment, an identifier of a PDU session of the user equipment, and the identifier of the MM component 1 that are in the context of the user equipment.

Step 1406: When the SM component needs to send a PDU session message to the user equipment, the SM component determines, based on the context of the user equipment that is updated in step 1405 and is stored in the SM component, to send the PDU session message to the user equipment via the MM component 2, and the SM component sends, to the MM component 2, the PDU session message to be sent to the user equipment, where the PDU session message includes the identifier of the user equipment.

Step 1407: The MM component 2 receives the PDU session message sent by the SM component, and obtains, based on the identifier of the user equipment in the PDU session message, context data of the user equipment from a context database used by the MM component 1, where the context data of the user equipment includes context data of a control-plane connection between the user equipment and a core network, an identifier of an access network that provides network access for the user equipment, context data of access and mobility management performed for the user equipment, and the like, such that the MM component 2 recovers the control-plane connection between the user equipment and the core network. The MM component 2 further sends the PDU session message to the user equipment via the control-plane connection between the user equipment and the core network.

Therefore, after the technical solution shown in FIG. 14 is used, when the MM component 1 serving the user equipment shuts down (cannot operate at all), an alternative MM component in a same MM component set as the MM component 1 is obtained. Then the alternative component processes all services of the MM component 1 and provides a service for the user equipment, the SM component in the core network, and the like. Therefore, service interruption is avoided. In addition, participation of the user equipment is not required in the process, that is, the process is unknown to the user equipment, such that network service reliability is improved.

Figure 6:
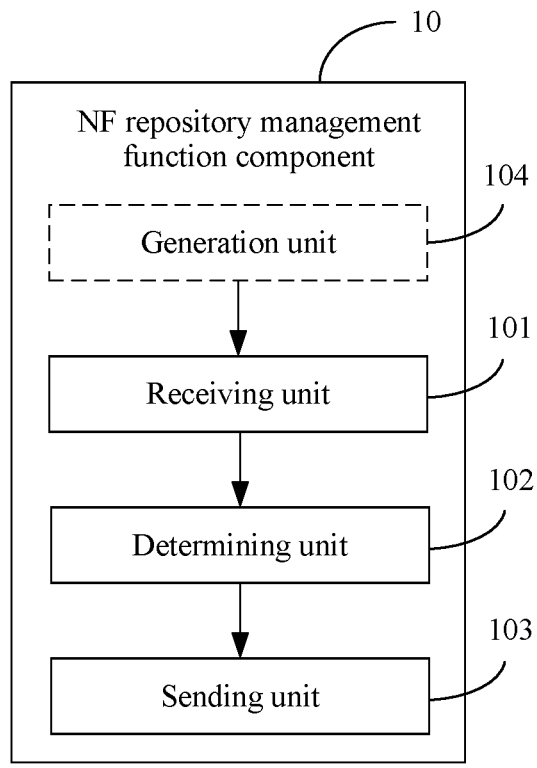
FIG. 6 is a schematic structural diagram of an NF repository management function component 10 according to an embodiment of the present disclosure.
Figure 7:
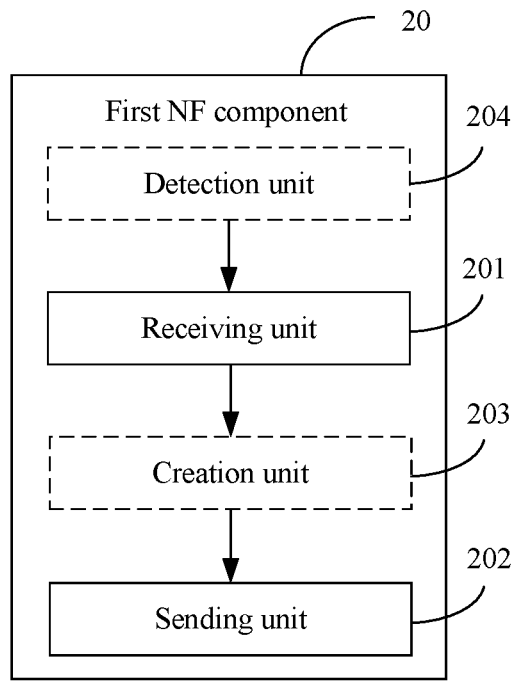
FIG. 7 is a schematic structural diagram of a first NF component 20 according to an embodiment of the present disclosure.
Figure 8:
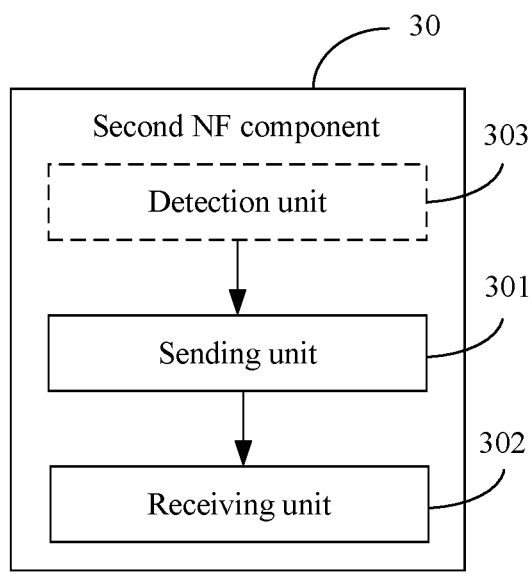
FIG. 8 is a schematic structural diagram of a second NF component 30 according to an embodiment of the present disclosure.

In the embodiments of the present disclosure, with reference to FIG. 6 to FIG. 8, the NF repository management function component, the first NF component, and the second NF component may be separately divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of the present disclosure is an example, and is only logical function division, and may be other division in actual implementation.

When each function module obtained through division based on a corresponding function is used, FIG. 6 is a possible schematic structural diagram of an NF repository management function component 10 in an embodiment of the present disclosure. As shown in FIG. 6, the NF repository management function component 10 may be configured to implement methods executed by the NF repository management function component in the method embodiments. The NF repository management function component 10 may include a receiving unit 101, a determining unit 102, and a sending unit 103. The receiving unit 101 is configured to support the NF repository management function component in performing step 105, step 205, and step 302 in FIG. 3-1, FIG. 3-2, FIG. 4, and FIG. 5. The determining unit 102 is configured to support the NF repository management function component in performing step 106, step 206, and step 303 in FIG. 3-1 and FIG. 3-2 to FIG. 5. Further, as shown in FIG. 6, the NF repository management function component 10 may further include a generation unit 104. The generation unit 104 is configured to support the NF repository management function component in generating at least one NF component set.

When an integrated unit is used, the receiving unit 101 and the sending unit 103 shown in FIG. 6 may be integrated into the communications interface 3011 of the NF repository management function component 300 shown in FIG. 1*a*-1 and FIG. 1*a*-2, and the communications interface 3011 executes functions of the receiving unit 101 and the sending unit 103. The determining unit 102 and the generation unit 104 shown in FIG. 6 may be integrated into the processor 3012 of the NF repository management function component 300 shown in FIG. 1*a*-1 and FIG. 1*a*-2, and the processor 3012 executes functions of the determining unit 102 and the generation unit 104. Further, the NF repository management function component 10 may further include a storage module. The storage module is configured to store program code and data of the NF repository management function component 10. The storage module may be the memory 3013 in the entity structure of the NF repository management function component 300 shown in FIG. 1*a*-1 and FIG. 1*a*-2.

When each function module obtained through division based on a corresponding function is used, FIG. 7 is a possible schematic structural diagram of a first NF component 20 in an embodiment of the present disclosure. As shown in FIG. 7, the first NF component 20 may be configured to implement methods executed by the first NF component in the method embodiments. The first NF component 20 may include a receiving unit 201 and a sending unit 202. The receiving unit 201 is configured to support the first NF component 20 in performing step 102, step 107, step 202, step 206, and step 303 in FIG. 3-1 and FIG. 3-2 to FIG. 5. The sending unit 202 is configured to support the first NF component 20 in performing step 103, step 109, step 203, step 205, step 208, step 302, and step 305 in FIG. 3-1 and FIG. 3-2 to FIG. 5. Further, the first NF component 20 may further include a creation unit 203 and a detection unit 204. The creation unit 203 is configured to support the first NF component 20 in performing step 103, step 203, step 207, and step 304 in FIG. 3-1 and FIG. 3-2 to FIG. 5. The detection unit 204 is configured to support the first NF component 20 in performing step 108, step 204, step 203, step 205, step 208, and step 301 in FIG. 3-1 and FIG. 3-2 to FIG. 5.

When an integrated unit is used, the receiving unit 201 and the sending unit 202 shown in FIG. 7 may be integrated into the communications interface 1011 of the first NF component 100 shown in FIG. 1*a*-1 and FIG. 1*a*-2, and the communications interface 1011 executes functions of the receiving unit 201 and the sending unit 202. The creation unit 203 and the detection unit 204 shown in FIG. 7 may be integrated into the processor 1012 of the first NF component 100 shown in FIG. 1*a*-1 and FIG. 1*a*-2, and the processor 1012 executes functions of the creation unit 203 and the detection unit 204. Further, the first NF component 20 may further include a storage module. The storage module is configured to store program code and data of the first NF component 20. The processing module may be the memory 1013 in the entity structure of the first NF component 100 shown in FIG. 1*a*-1 and FIG. 1*a*-2.

When each function module obtained through division based on a corresponding function is used, FIG. 8 is a possible schematic structural diagram of a second NF component 30 in an embodiment of the present disclosure. As shown in FIG. 8, the second NF component 30 may be configured to implement methods executed by the second NF component in the method embodiments. The second NF component 30 may include a sending unit 301 and a receiving unit 302. The sending unit 301 is configured to support the second NF component 30 in performing step 102, step 105, step 107, and step 202 shown in FIG. 3-1 and FIG. 3-2 to FIG. 5. The receiving unit 302 is configured to support the second NF component 30 in performing step 103, step 106, and step 203 shown in FIG. 3-1 and FIG. 3-2 to FIG. 5. Further, as shown in FIG. 8, the second NF component 30 may further include a detection unit 303. The detection unit 303 is configured to support the second NF component 30 in performing step 104 shown in FIG. 3-1 and FIG. 3-2 to FIG. 5.

When an integrated unit is used, the sending unit 301 and the receiving unit 302 shown in FIG. 8 may be integrated into the communications interface 2011 of the second NF component 200 shown in FIG. 1*a*-1 and FIG. 1*a*-2, and the communications interface 2011 executes functions of the sending unit 301 and the receiving unit 302. The detection unit 303 shown in FIG. 8 may be integrated into the processor 2012 of the second NF component 200 shown in FIG. 1a-1 and FIG. 1a-2, and the processor 2012 executes a function of the detection unit 303. Further, the second NF component 20 may further include a storage module. The storage module is configured to store program code and data of the second NF component 20. The processing module may be the memory 2013 in the entity structure of the second NF component 200 shown in FIG. 1a-1 and FIG. 1a-2.

Figure 15:
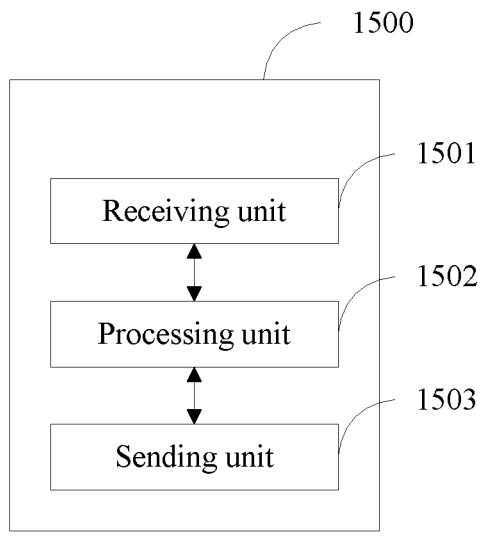
FIG. 15 is a schematic structural diagram of a network device according to an embodiment of the present disclosure.

FIG. 15 is another possible schematic structural diagram of an NF repository management function component in an embodiment of the present disclosure. The NF repository management function component is configured to implement functions of the NF repository management function component in the method embodiments in FIG. 10 to FIG. 14. The NF repository management function component may include a receiving unit 1501, a processing unit 1502, and a sending unit 1503. The receiving unit 1501 and the sending unit 1503 are configured to support the NF repository management function component in receiving information from or sending information to another network element in the foregoing embodiments. The processing unit 1502 executes various processing functions. For example, the receiving unit 1501 is configured to support the NF repository management function component in performing a related step such as step 1002, step 1103, step 1203, step 1303, or step 1403 in FIG. 10 to FIG. 14. The processing unit 1502 is configured to support the NF repository management function component in performing a related step such as step 1003, step 1104, step 1204, step 1304, or step 1404 in FIG. 10 to FIG. 14. The sending unit 1503 is configured to support the NF repository management function component in performing a related step such as step 1004, step 1105, step 1205, step 1305, or step 1405 in FIG. 10 to FIG. 14. Optionally, the processing unit 1502 is configured to support the NF repository management function component in generating at least one NF component set. Optionally, the NF repository management function component may further include a storage module (not shown in the figure), and the storage module is configured to store program code and data of the NF repository management function component.

FIG. 15 may be further used as a possible schematic structural diagram of a first network element in an embodiment of the present disclosure. The first network element is configured to implement functions of the first network element, the access network AN, the MM component 1, or the SM component in the method embodiments in FIG. 10 to FIG. 14. The first network element may include a receiving unit 1501, a processing unit 1502, and a sending unit 1503. The receiving unit 1501 and the sending unit 1503 are configured to support the first network element in receiving information from or sending information to another network element in the foregoing embodiments. The processing unit 1502 executes various processing functions. For example, the receiving unit 1501 is configured to support the first network element in performing a related step such as step 1004, step 1106, step 1206, step 1306, or step 1405 in FIG. 10 to FIG. 14. The processing unit 1502 is configured to support the first network element in performing a related step such as step 1001, step 1005, step 1102, step 1106, step 1202, step 1206, step 1302, step 1402, or step 1406 in FIG. 10 to FIG. 14. The receiving unit 1503 is configured to support the first network element in performing a related step such as step 1002, step 1103, step 1203, step 1303, step 1403, or step 1407 in FIG. 10 to FIG. 14. Optionally, the first network element may further include a storage module (not shown in the figure), and the storage module is configured to store program code and data of the first network element.

It may be understood that, the processing unit 1502 in FIG. 15 may be a processor or a controller, for example, may be a Central Processing Unit (CPU), a general purpose processor, a Digital Signal Processor (DSP), an application-specific integrated circuit (ASIC), a field programmable gate array (FPGA) or another programmable logic device, a transistor logic device, a hardware device, or any combination thereof. The processing unit 1502 may implement or execute example logical blocks, modules, and circuits that are described with reference to content disclosed in the present disclosure. Alternatively, the processing unit may be a combination that implements a computing function, for example, a combination of one or more microprocessors or a combination of a DSP and a microprocessor. The receiving unit 1501 and the sending unit 1503 may be a transceiver. The storage unit may be a memory.

Figure 16:
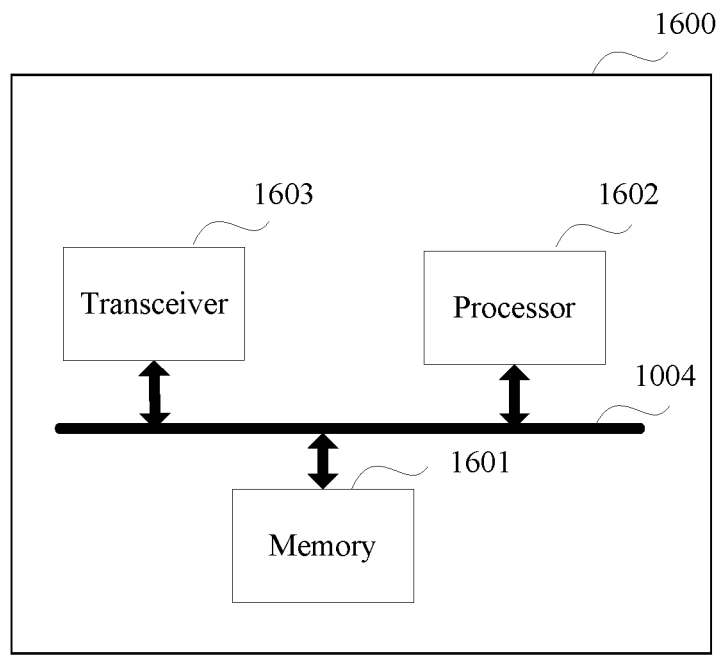
FIG. 16 is a schematic structural diagram of another network device according to an embodiment of the present disclosure.

When the processing unit 1502 is a processor, the receiving unit 1501 and the sending unit 1503 is a transceiver, and the storage unit is a memory, the NF repository management function component and the first network element in this embodiment of the present disclosure may be a network device shown in FIG. 16.

It should be noted that, all related content of the steps in the method embodiments may be cited as function descriptions of corresponding function modules. Details are not described herein again.

Figure 9:
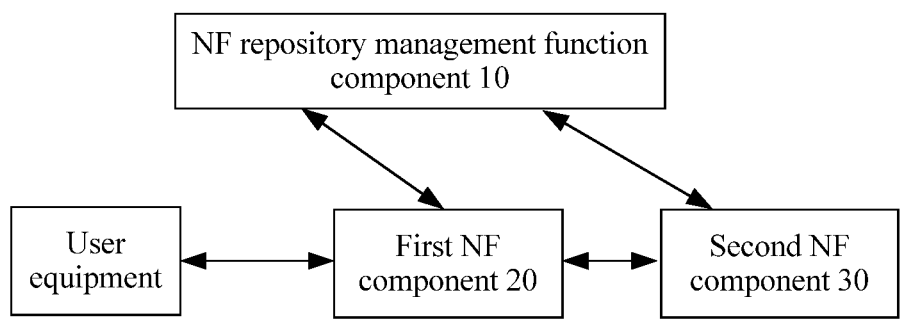
FIG. 9 is a structural diagram of a system for processing an NF component exception according to an embodiment of the present disclosure.

In another aspect, an embodiment of the present disclosure further provides a system for processing an NF component exception. As shown in FIG. 9, the processing system may include user equipment, an NF repository management function component 10, a first NF component 20, and a second NF component 30.

The NF repository management function component 10, the first NF component 20, and the second NF component 30 are the same as the foregoing devices. Details are not described herein again.

In addition, the system for processing an NF component exception provided in this embodiment of the present disclosure implements the methods for processing an NF component exception shown in FIG. 3-1 and FIG. 3-2 to FIG. 5, and FIG. 10 to FIG. 14. Therefore, same beneficial effects as those achieved in the foregoing method for processing an NF component exception can be achieved, and details are not described herein again.

It may be clearly understood by persons skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual needs to achieve the objectives of the solutions of the embodiments.

In addition, function units in the embodiments of the present disclosure may be integrated into one processing unit, or each of the function units may exist alone, or two or more units are integrated into one unit. The integrated unit may be implemented in a form of hardware, or may be implemented in a form of hardware in addition to a software function unit.

When the foregoing integrated unit is implemented in a form of a software function unit, the integrated unit may be stored in a computer-readable storage medium. The software function unit is stored in a storage medium and includes several instructions for instructing a computer device (which may be a personal computer, a server, a network device, or the like) to perform some of the steps of the methods described in the embodiments of the present disclosure. The foregoing storage medium includes: any medium that can store program code, such as a Universal Serial Bus (USB) flash drive, a removable hard disk, a read-only memory (ROM), a random access memory (RAM), a magnetic disk, or an optical disc.

Finally, it should be noted that, the foregoing embodiments are only intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. A method for processing a network function (NF) component exception, wherein the method comprises:
    receiving, by an NF repository management function component, a registration request message from a second NF component, wherein the registration request message comprises an identifier of the second NF component and a set identifier of an NF component set to which the second NF component belongs,
    receiving, by the NF repository management function component, a registration request message from a third NF component, wherein the third NF component and the second NF component belong to the same NF component set, and the registration request message comprises an identifier of the third NF component and the set identifier,
    receiving, by the NF repository management function component, a discovery request from a first network element when the second NF component cannot provide a service, wherein the discovery request comprises the set identifier,
    finding, by the NF repository management function component, the identifier of the third NF component as an alternative NF component based on the set identifier, and
    sending, by the NF repository management function component, the identifier of the third NF component to the first network element.

2. The method according to claim 1, wherein finding, by the NF repository management function component, the identifier of the third NF component based on the set identifier comprises:
    learning of, by the NF repository management function component based on the set identifier, the NF component set to which the second NF component belongs; and
    selecting the third NF component from the NF component set to which the second NF component belongs, wherein the third NF component includes one or more NF components.

3. The method according to claim 1, wherein the first network element is one of a first NF component, the second NF component, or an access network.

4. The method according to claim 1, further comprising:
    sending, by the first network element, the set identifier to the NF repository management function component; and
    receiving, by the first network element, the identifier of the third NF component from the NF repository management function component.

5. The method according to claim 4, further comprising:
    learning, by the first network element, that the second NF component cannot provide a service, and
    obtaining, by the first network element, the set identifier.

6. The method according to claim 5, wherein obtaining, by the first network element, the set identifier comprises either:
    locally obtaining the set identifier; or
    receiving, by the first network element, a message from a user equipment, wherein the message carries the set identifier, and wherein the first network element obtains the set identifier carried in the message.

7. The method according to claim 4, wherein when the first network element is an access network, sending, by the first network element, the set identifier to the NF repository management function component comprises sending, by the access network, the set identifier to the NF repository management function component via an NF discovery management function, and
    wherein when the first network element is the access network, receiving, by the first network element, the identifier of the third NF component from the NF repository management function component comprises receiving, by the access network via the NF discovery management function, the identifier of the third NF component from the NF repository management function component.

8. The method according to claim 4, further comprising sending, by the second NF component, the identifier of the third NF component to an access network when the first network element is the second NF component.

9. A network function (NF) repository management function component, comprising:
    a memory storing instructions; and
    one or more processors in communication with the memory, wherein the one or more processors execute the instructions to:
        receive a registration request message from a second NF component, wherein the registration request message comprises an identifier of the second NF component and a set identifier of an NF component set to which the second NF component belongs,
        receive a registration request message from a third NF component, wherein the third NF component and the second NF component belong to the same NF component set, and the registration request message comprises an identifier of the third NF component and the set identifier, receive a discovery request from a first network element when the second NF component cannot provide a service, wherein the discovery request comprises the set identifier,
find the identifier of the third NF component as an alternative NF component based on the set identifier, and
send the identifier of the third NF component to the first network element.

10. The NF repository management function component according to claim 9, wherein the one or more processors execute the instructions to:
learn of, based on the set identifier, an NF component set to which the second NF component belongs, and
select the third NF component from the NF component set to which the second NF component belongs, wherein the third NF component includes one or more NF components.

11. A system, comprising:
a first network element configured to:
learn that a second network function (NF) component cannot provide a service;
obtain a set identifier of an NF component set to which the second NF component belongs; and
send the set identifier; and
an NF repository management function component configured to:
receive a registration request message from the second NF component; wherein the registration request message comprises an identifier of the second NF component and the set identifier;
receive a registration request message from a third NF component; wherein the third NF component and the second NF component belong to the same NF component set; and the registration request message comprises an identifier of the third NF component and the set identifier;
receive the set identifier from the first network element;
find the identifier of the third NF component as an alternative NF component based on the set identifier; wherein the third NF component and the second NF component belong to a same NF component set, and
send the identifier of the third NF component to the first network element.

12. The system according to claim 11, wherein the NF repository management function component is configured to find the identifier of the third NF component by:
learning of, based on the set identifier, an NF component set to which the second NF component belongs; and
selecting the third NF component from the NF component set to which the second NF component belongs, wherein the third NF component comprises one or more NF components.

13. The system according to claim 11, wherein the first network element is configured to either:
locally obtain the set identifier, or
receive a message from a user equipment, wherein the message carries the set identifier, and wherein the first network element is configured to obtain the set identifier carried in the message.

14. The system according to claim 11, wherein the first network element is one of a first NF component, the second NF component, or an access network.

15. The method according to claim 1, wherein context data of a user equipment is shared by the second NF component and the third NF component.

16. The NF repository management function component according to claim 9, wherein context data of a user equipment is shared by the second NF component and the third NF component.

17. The system according to claim 11, wherein context data of a user equipment is shared by the second NF component and the third NF component.

18. The method according to claim 1, wherein the third NF component and the second NF component have a same NF type, wherein the registration request message from the second NF component comprise the NF type, and wherein the registration request message from the third NF component comprises the NF type.

19. The method according to claim 1, wherein:
the first network element is an access network, and the second NF component is a mobility management component, or
the first network element is a mobility management component, and the second NF component is a session management component or a small data component, or
the first network element is a session management component or a small data component,and the second NF component is a mobility management component; or
the first network element is the second NF component, and the second NF component is a mobility management component.

20. The method according to claim 1, wherein the discovery request comprises the identifier of the second NF component.

21. The NF repository management function component according to claim 9, wherein the third NF component and the second NF component have a same NF type, wherein the registration request message from the second NF component comprises the NF type, and wherein the registration request message from the third NF component comprises the NF type.

22. The NF repository management function component according to claim 9, wherein:
the first network element is an access network, and the second NF component is a mobility management component, or
the first network element is a mobility management component, and the second NF component is a session management component or a small data component, or
the first network element is a session management component or a small data component, and the second NF component is a mobility management component, or
the first network element is the second NF component, and the second NF component is a mobility management component.

23. The NF repository management function component according to claim 9, wherein the discovery request comprises the identifier of the second NF component.

24. The system according to claim 11, wherein the third NF component and the second NF component have a same NF type, wherein the registration request message from the second NF component comprise the NF type, and wherein the registration request message from the third NF component comprises the NF type.

25. The system according to claim 11, wherein:
the first network element is an access network, and the second NF component is a mobility management component, or
the first network element is a mobility management component, and the second NF component is a session management component or a small data component, or the first network element is a session management component or a small data component, and the second NF component is a mobility management component, or the first network element is the second NF component, and the second NF component is a mobility management component.

26. The system according to claim 11, wherein the NF repository management function component is further configured to receive, from the first network element, the identifier of the second NF component.

\* \* \* \* \*